United States Patent
Thomas et al.

(10) Patent No.: US 11,060,428 B2
(45) Date of Patent: Jul. 13, 2021

(54) EXHAUST VALVE DAMPER

(71) Applicant: Tenneco Automotive Operating Company Inc., Lake Forest, IL (US)

(72) Inventors: Stephen M. Thomas, Laingsburg, MI (US); Garrick Zuver, Brooklyn, MI (US); Danny Alexander, Horton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 664 days.

(21) Appl. No.: 15/988,417

(22) Filed: May 24, 2018

(65) Prior Publication Data

US 2019/0360374 A1    Nov. 28, 2019

(51) Int. Cl.
*F01N 1/16* (2006.01)
*F16K 1/18* (2006.01)
(Continued)

(52) U.S. Cl.
CPC ............. *F01N 1/166* (2013.01); *F01N 1/163* (2013.01); *F01N 1/18* (2013.01); *F16K 1/221* (2013.01); *F16K 1/222* (2013.01); *F01N 1/24* (2013.01); *F01N 2240/36* (2013.01); *F01N 2260/16* (2013.01); *F01N 2470/02* (2013.01)

(58) Field of Classification Search
CPC . F01N 1/16; F01N 1/165; F01N 1/166; F01N 1/18; F01N 2240/36; F01N 2260/16; F16K 1/16; F16K 1/18; F16K 1/22; F16K 1/221; F16K 1/222; F16F 15/167; F16F 7/10; F16F 7/1028; Y10T 137/7903; Y10T 137/7898; Y10T 137/7908; Y10T 137/7904; Y10T 137/7921
See application file for complete search history.

(56) References Cited

U.S. PATENT DOCUMENTS 215,887 A    5/1879  Crossman et al.
377,963 A    2/1888  Smith
(Continued)

FOREIGN PATENT DOCUMENTS

CN    10248256 A    4/2012
EP    2738365 A1    6/2014
(Continued)

OTHER PUBLICATIONS

Office Action in Corresponding CN Application No. 2017800495472 dated Jun. 2, 2020 (in Chinese with English Translation).

*Primary Examiner* — Edgardo San Martin
(74) *Attorney, Agent, or Firm* — Harness, Dickey & Pierce, P.L.C.

(57) ABSTRACT

A snap-action valve assembly for an exhaust system is provided with a conduit that defines an exhaust passageway. A valve flap is disposed within the exhaust passageway for controlling exhaust flow. A shaft supports the valve flap in the exhaust passageway and allows the valve flap to rotate between closed and open positions. A mass damper, positioned outside the conduit, includes a longitudinal segment that is rotatably coupled to the shaft and that extends between first and second coiled ends. The longitudinal segment includes an inboard side and an outboard side. The first and second coiled ends include a series of overlapping layers arranged in either a folded serpentine shape or a spiral shape.

20 Claims, 18 Drawing Sheets

(51) Int. Cl.
    *F16F 15/167*     (2006.01)
    *F16F 7/10*       (2006.01)
    *F01N 1/18*       (2006.01)
    *F16K 1/22*       (2006.01)
    *F01N 1/24*       (2006.01)

(56) References Cited

U.S. PATENT DOCUMENTS

| | | | |
|---|---|---|---|
| 468,985 A | 2/1892 | Downs | |
| 987,946 A * | 3/1911 | Bergler | F16K 47/10 137/513.3 |
| 1,063,637 A | 6/1913 | Barker | |
| 1,337,326 A | 4/1920 | Rice | |
| 1,348,562 A | 8/1920 | Hauser | |
| 1,354,244 A | 9/1920 | Clifford | |
| 1,517,335 A | 12/1924 | Zinis | |
| 1,995,190 A * | 3/1935 | Rostoker | H02G 7/14 174/42 |
| 2,060,289 A * | 11/1936 | Downs | F24F 13/15 454/320 |
| 2,584,222 A * | 2/1952 | O'Connor | F16F 7/10 74/5.5 |
| 2,824,755 A | 2/1958 | Lamphear | |
| 2,859,772 A * | 11/1958 | Weiss | F16K 1/221 137/527.8 |
| 3,128,785 A | 4/1964 | Krummel | |
| 3,352,318 A * | 11/1967 | Yanowitz | F16K 15/03 137/484.2 |
| 3,448,759 A * | 6/1969 | Peerman | E03B 7/07 137/357 |
| 3,565,099 A | 2/1971 | Huber | |
| 3,726,308 A | 4/1973 | Eberhardt | |
| 4,187,815 A * | 2/1980 | Kobayashi | F02M 31/083 123/548 |
| 4,254,752 A | 3/1981 | Friddell et al. | |
| 4,541,506 A | 9/1985 | Venning et al. | |
| 4,825,983 A * | 5/1989 | Nakanishi | H02K 37/22 188/378 |
| 4,858,738 A | 8/1989 | Novoa | |
| 5,355,673 A | 10/1994 | Sterling et al. | |
| 5,669,350 A | 9/1997 | Altmann et al. | |
| 5,744,762 A | 4/1998 | Seki et al. | |
| 5,884,898 A | 3/1999 | Miyairi | |
| 5,947,696 A * | 9/1999 | Baumgarten | F04B 35/06 417/233 |
| 6,003,490 A | 12/1999 | Kihara et al. | |
| 6,047,950 A | 4/2000 | Pontoppidan et al. | |
| 6,085,781 A | 7/2000 | Boutry | |
| 6,152,173 A | 11/2000 | Makowan | |
| 6,338,246 B2 | 1/2002 | Eguchi et al. | |
| 6,527,006 B2 | 3/2003 | Jackson | |
| 6,736,160 B2 | 5/2004 | Nagai et al. | |
| 7,310,942 B2 | 12/2007 | Shiga et al. | |
| 7,451,854 B2 | 11/2008 | Suzuki et al. | |
| 7,802,424 B2 | 9/2010 | Kanzawa et al. | |
| 7,896,130 B2 | 3/2011 | Hill et al. | |
| 8,201,660 B2 | 6/2012 | Han et al. | |
| 8,256,454 B2 | 9/2012 | Xu et al. | |
| 8,448,627 B2 | 5/2013 | Kondo et al. | |
| 8,453,672 B2 | 6/2013 | Abram et al. | |
| 8,468,813 B2 | 6/2013 | Hill et al. | |
| 8,657,065 B1 | 2/2014 | Hill | |
| 8,800,263 B2 | 8/2014 | Eder et al. | |
| 9,121,315 B2 | 9/2015 | Abram et al. | |
| 9,376,947 B2 | 6/2016 | Abram et al. | |
| 9,464,559 B2 | 10/2016 | Middleton, Jr. et al. | |
| 9,540,995 B2 | 1/2017 | Houtschilt et al. | |
| 9,624,837 B2 | 4/2017 | Abram | |
| 9,726,081 B2 * | 8/2017 | Zahoransky | F02C 6/12 |
| 9,982,794 B2 | 5/2018 | Thomas | |
| 10,151,212 B2 | 12/2018 | Pless | |
| 10,180,092 B2 | 1/2019 | Geer et al. | |
| 10,436,088 B2 * | 10/2019 | Thomas | F02D 9/106 |
| 10,518,632 B2 * | 12/2019 | Bell | F01N 1/006 |
| 10,598,059 B2 * | 3/2020 | Geer | F01N 1/026 |
| 10,788,136 B1 * | 9/2020 | Thomas | F01N 1/163 |
| 2002/0162983 A1 | 11/2002 | Bailey | |
| 2005/0211221 A1 | 9/2005 | Matsuda | |
| 2007/0095406 A1 | 5/2007 | Colton et al. | |
| 2008/0223025 A1 | 9/2008 | Hill | |
| 2009/0116938 A1 | 5/2009 | Wakabayashi | |
| 2009/0126356 A1 | 5/2009 | Abram et al. | |
| 2010/0263211 A1 | 10/2010 | Sahs et al. | |
| 2010/0263743 A1 | 10/2010 | Lefler et al. | |
| 2010/0313554 A1 | 12/2010 | Abram | |
| 2011/0290349 A1 | 12/2011 | Cozens | |
| 2013/0056083 A1 | 3/2013 | Abram et al. | |
| 2013/0232961 A1 | 9/2013 | Abram | |
| 2013/0299004 A1 | 11/2013 | Abram | |
| 2014/0053923 A1 | 2/2014 | Martinelli et al. | |
| 2014/0246617 A1 | 9/2014 | Diel | |
| 2015/0162760 A1 | 6/2015 | Clark | |
| 2016/0032794 A1 | 2/2016 | Fischer et al. | |
| 2017/0204756 A1 | 7/2017 | Middleton, Jr. et al. | |
| 2018/0051607 A1 | 2/2018 | Geer et al. | |
| 2018/0051610 A1 | 2/2018 | Thomas et al. | |
| 2018/0238459 A1 | 8/2018 | Nowell et al. | |
| 2020/0017057 A1 * | 1/2020 | Hirota | F16F 7/1028 |
| 2020/0309278 A1 * | 10/2020 | Thomas | F01N 13/08 |

FOREIGN PATENT DOCUMENTS

| | | | |
|---|---|---|---|
| GB | 1506798 A * | 4/1978 | F16F 15/1442 |
| GB | 2121913 B * | 1/1986 | F16F 15/167 |
| JP | H1030444 A | 2/1998 | |
| JP | 2006009667 A | 1/2006 | |
| JP | 5044631 B2 | 10/2012 | |
| JP | 2016079807 A | 5/2016 | |
| KR | 101000903 B1 | 12/2010 | |
| KR | 101298481 B1 | 8/2013 | |
| KR | 20150008563 A | 1/2015 | |
| KR | 20150051350 A | 5/2015 | |
| WO | 2010135095 A2 | 11/2010 | |
| WO | 20150027566 A1 | 3/2015 | |
| WO | WO-2016111326 A1 | 7/2016 | |

* cited by examiner

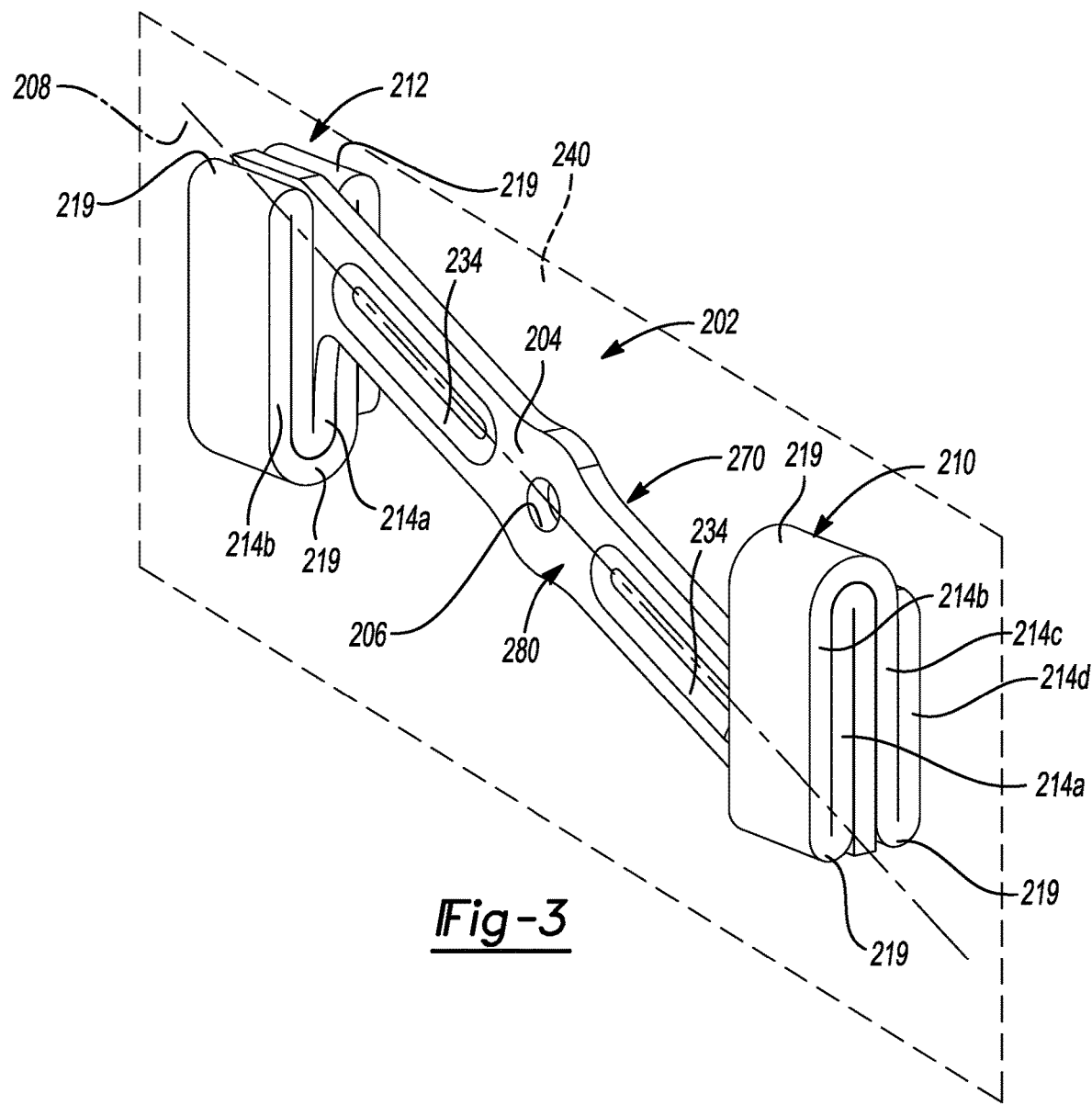
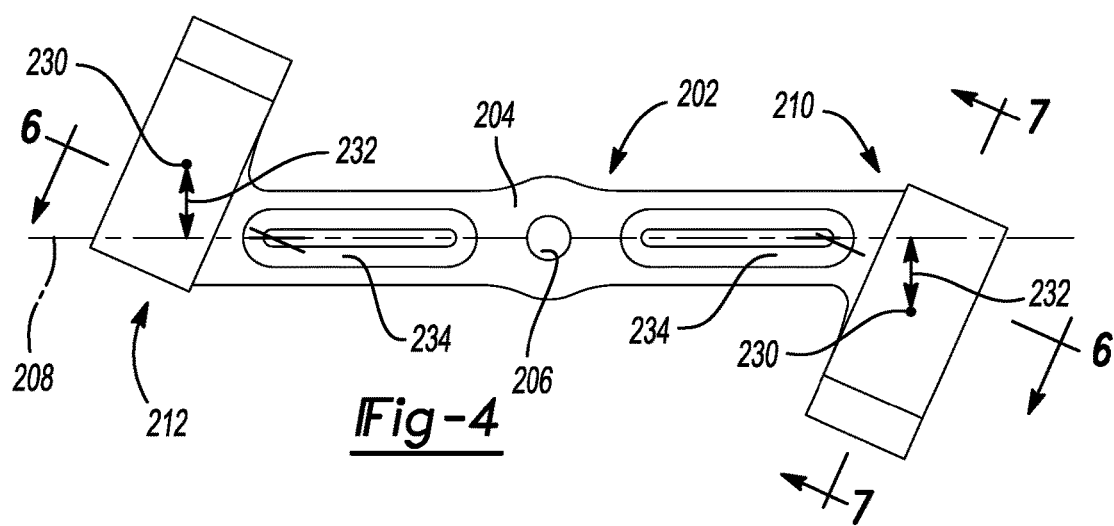

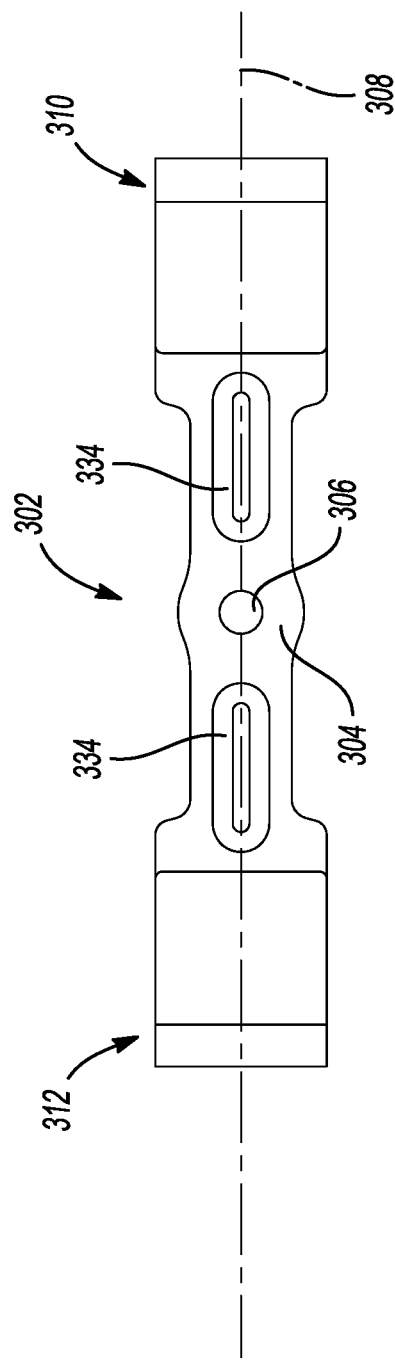
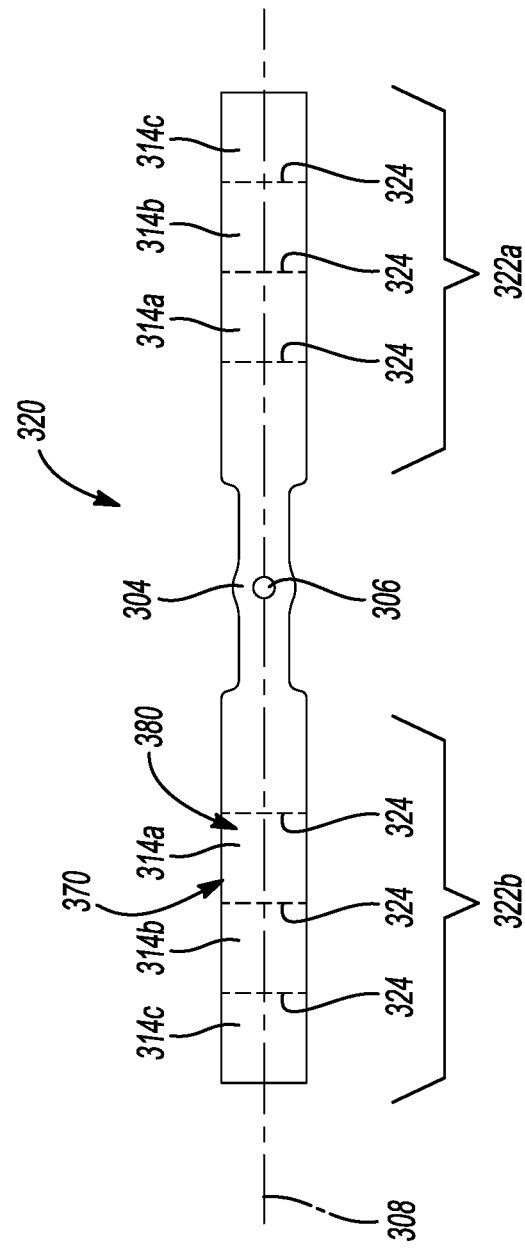

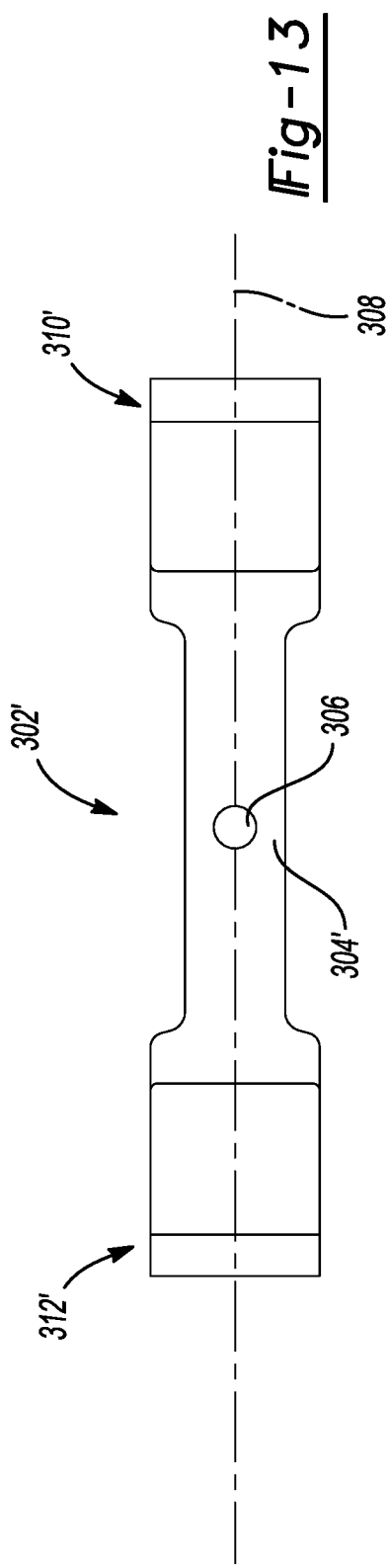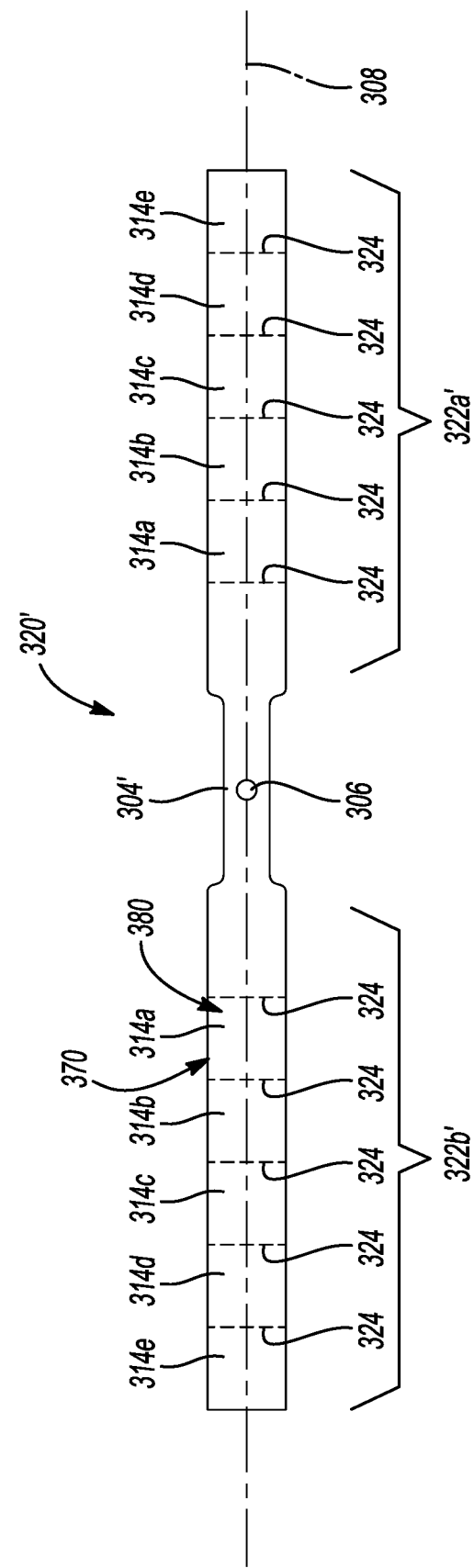

EXHAUST VALVE DAMPER

FIELD

The subject disclosure relates to valve assemblies used in an exhaust system of a vehicle and to methods of manufacturing such valve assemblies.

BACKGROUND

This section provides background information related to the present disclosure which is not necessarily prior art.

Many vehicle exhaust systems use active and/or passive valve assemblies to alter the characteristics of exhaust flow through a conduit as the exhaust pressure increases due to increasing engine speed. Such valves can be used to reduce low frequency noise by directing exhaust through mufflers or other exhaust system components. For example, valves can direct exhaust flow past obstructions, which create vortices that absorb low frequency sound energy. Active valves carry the increased expense of requiring a specific actuating element, such as a solenoid. By contrast, passive valves generally include a spring biased valve flap and utilize the pressure of the exhaust flow in the conduit to actuate (i.e., open) the valve. Although passive valves are less expensive, traditional passive valves create unwanted back pressure when the valve is open, can be difficult to manufacture, and are susceptible to vibration related noise and excessive valve flutter caused by flowrate fluctuations in the engine's exhaust flow (i.e., exhaust pulsation). Such valves can present vibration and noise problems due to resonance of the valve flap and biasing spring. As a result, there remains a need for passive valves that are quieter and less expensive to manufacture than existing passive valves.

SUMMARY

This section provides a general summary of the disclosure and is not a comprehensive disclosure of its full scope or all of its features.

In accordance with the subject disclosure, a snap-action valve assembly for an exhaust system is provided. The snap-action valve assembly includes a conduit that defines an exhaust passageway. A valve flap is disposed within the exhaust passageway for controlling exhaust flow through the exhaust passageway. A shaft supports the valve flap in the exhaust passageway and allows the valve flap to rotate between a closed position and an open position in the exhaust passageway about a pivot axis. The snap-action valve assembly further comprises a mass damper that is positioned outside (i.e., external to) the conduit. The mass damper extends between first and second coiled ends and includes a longitudinal segment that is rotatably coupled to the shaft. The longitudinal segment includes an inboard side that faces the conduit and an outboard side that faces away from the conduit. The first and second coiled ends include a series of overlapping layers.

In accordance with one aspect of the subject disclosure, at least one layer in the series of overlapping layers extends over (i.e., overlaps with) the inboard side of the longitudinal segment at the first and second coiled ends. In addition, at least one layer in the series of overlapping layers extends over (i.e., overlaps with) the outboard side of the longitudinal segment at the first and second coiled ends.

In accordance with another aspect of the subject disclosure, the series of overlapping layers at each of the first and second coiled ends has a spiral shape. Each layer in the series of overlapping layers has a first side and a second side. Due to the spiral shape of the first and second coiled ends, the first side of one layer abuts the second side of an adjacent layer.

Advantageously, the mass dampers of the snap-action valve assembly disclosed herein provide improved dampening of vibration related harmonics and valve flutter caused by flowrate fluctuations in the engine's exhaust flow (i.e. exhaust pulsation). In addition, the mass dampers disclosed herein have improved aesthetics and are cheaper to manufacture than existing designs.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 3 is a side perspective view of an exemplary mass damper constructed in accordance with the teachings of the subject disclosure;

FIG. 4 is a side elevation view of the exemplary mass damper shown in FIG. 3;

FIG. 9 is a side elevation view of the exemplary mass damper shown in FIG. 8;

FIG. 10 is a side elevation view of an exemplary blank for the mass damper shown in FIG. 8 depicted before the first and second coiled ends are formed;

FIG. 13 is a side elevation view of the exemplary mass damper shown in FIG. 12;

FIG. 14 is a side elevation view of an exemplary blank for the mass damper shown in FIG. 12 depicted before the first and second coiled ends are formed;

Corresponding reference numerals indicate corresponding parts throughout the several views of the drawings.

DETAILED DESCRIPTION

Figure 1:
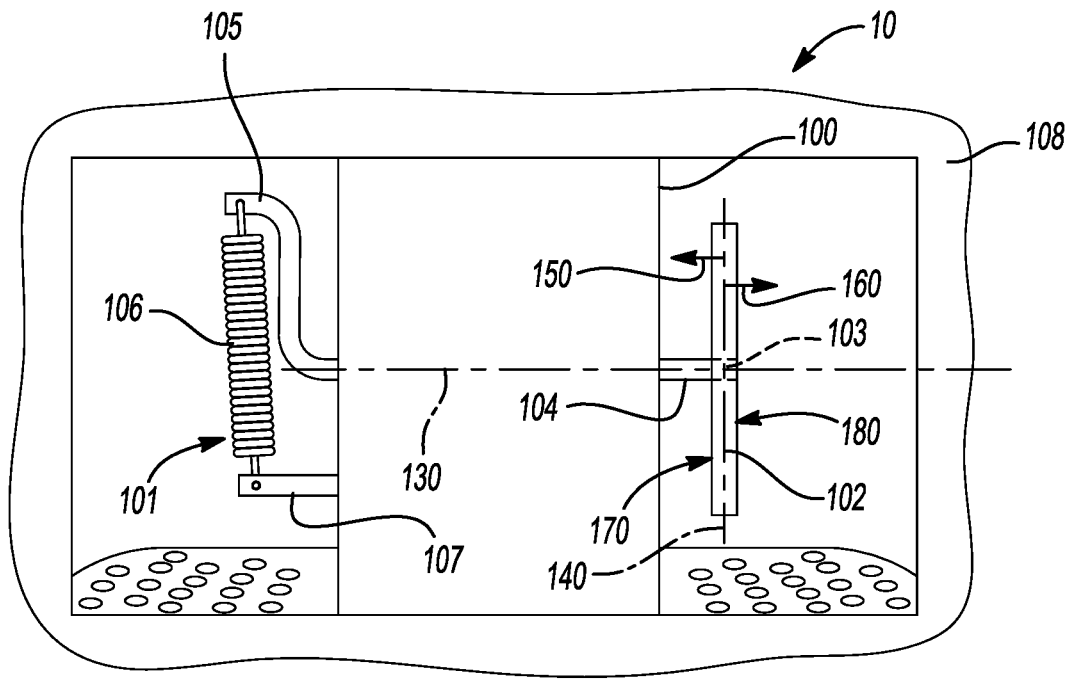
FIG. 1 is a top plan view of a muffler in which a snap action valve assembly is mounted and equipped with a mass damper.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "abuts" means that one structure is disposed in contact with or arranged in close proximity to another structure. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. The terms "coiled end" and "coiled ends" used herein are meant to describe bent, folded, serpentine, and spiral shapes and therefore are not limited to structures that are wound around a central axis.

Figure 2:
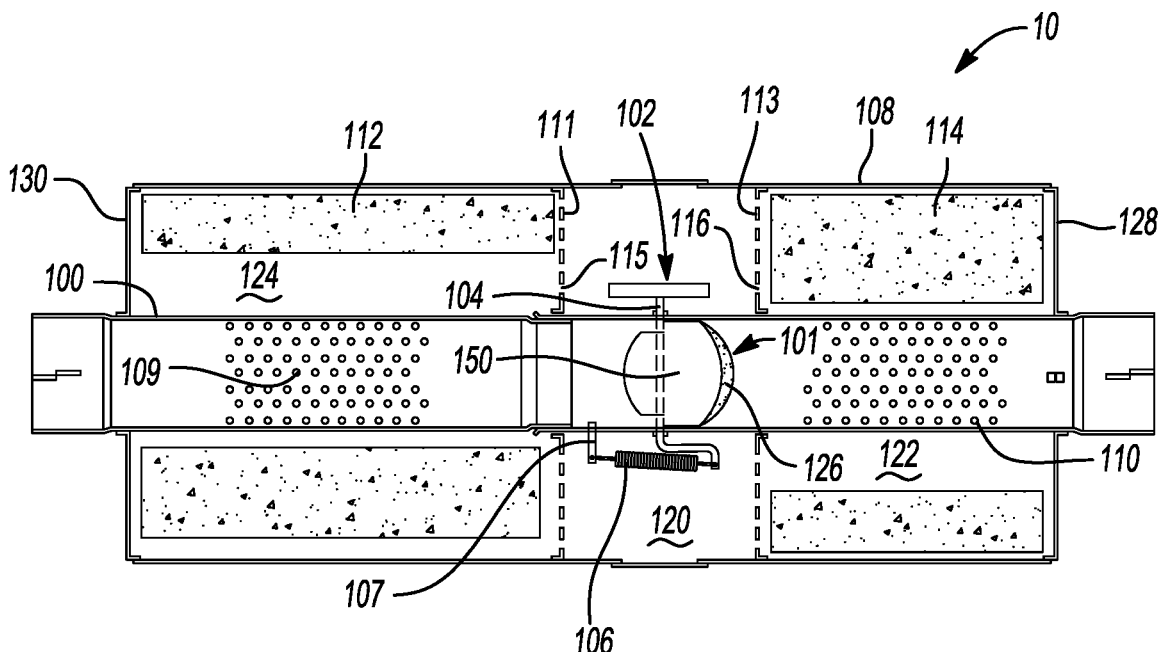
FIG. 2 is a top cross-sectional view of a muffler housing a snap action valve assembly equipped with a mass damper in accordance with the teachings of the subject disclosure.
Figure 5:
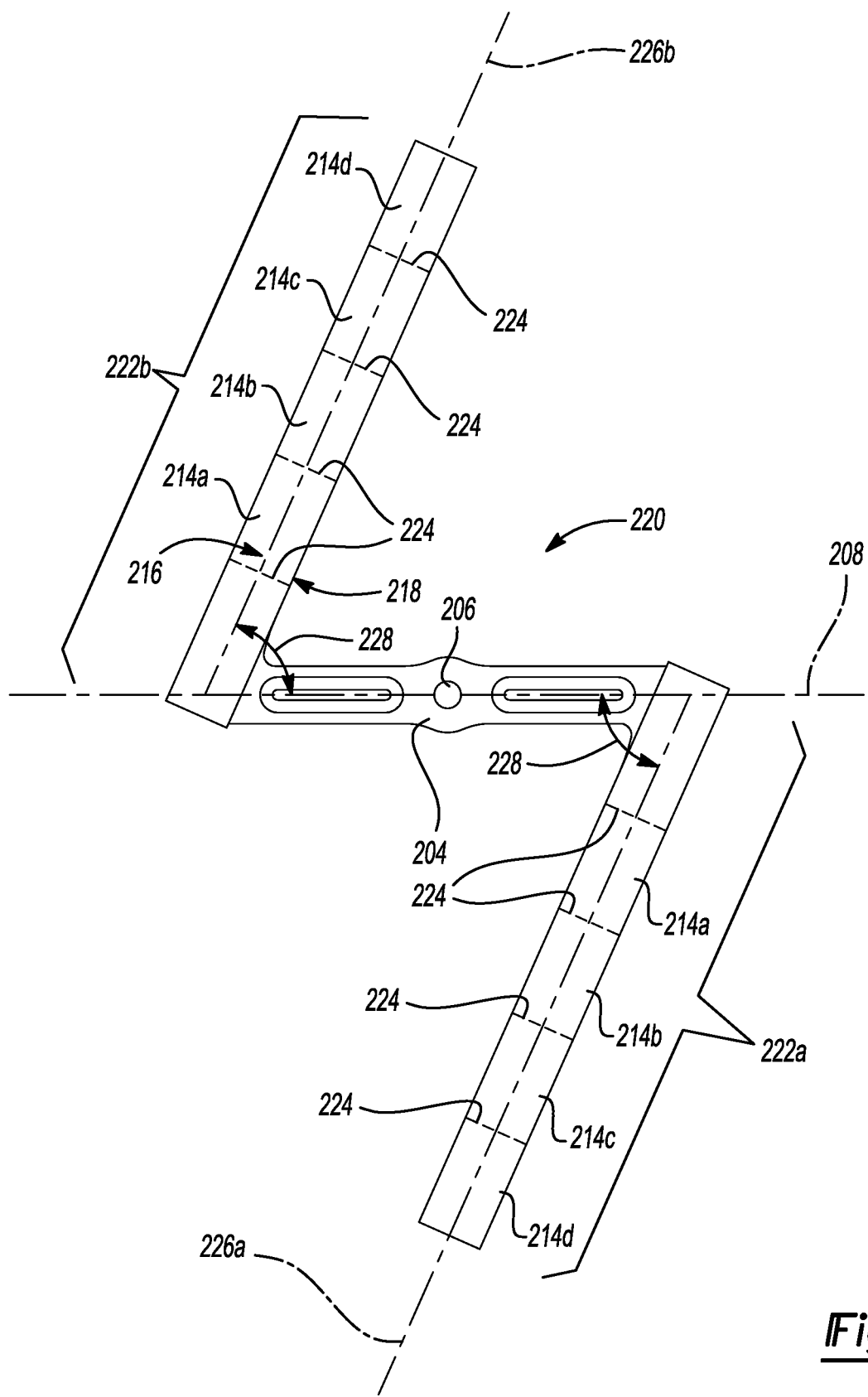
FIG. 5 is a side elevation view of an exemplary blank for the mass damper shown in FIG. 3 depicted before the first and second coiled ends are formed.
Figure 6:
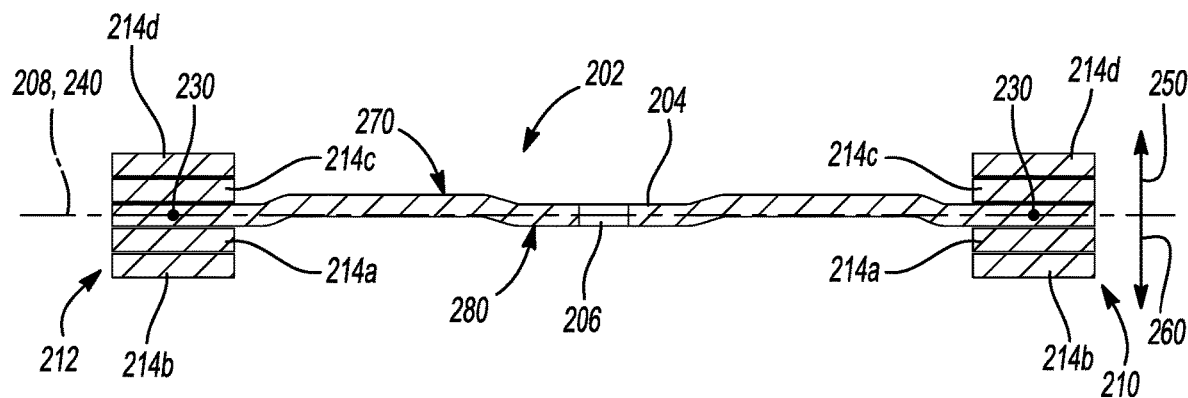
FIG. 6 is a top cross-sectional view of the exemplary mass damper shown in FIG. 4 taken along section line 6-6.
Figure 7:
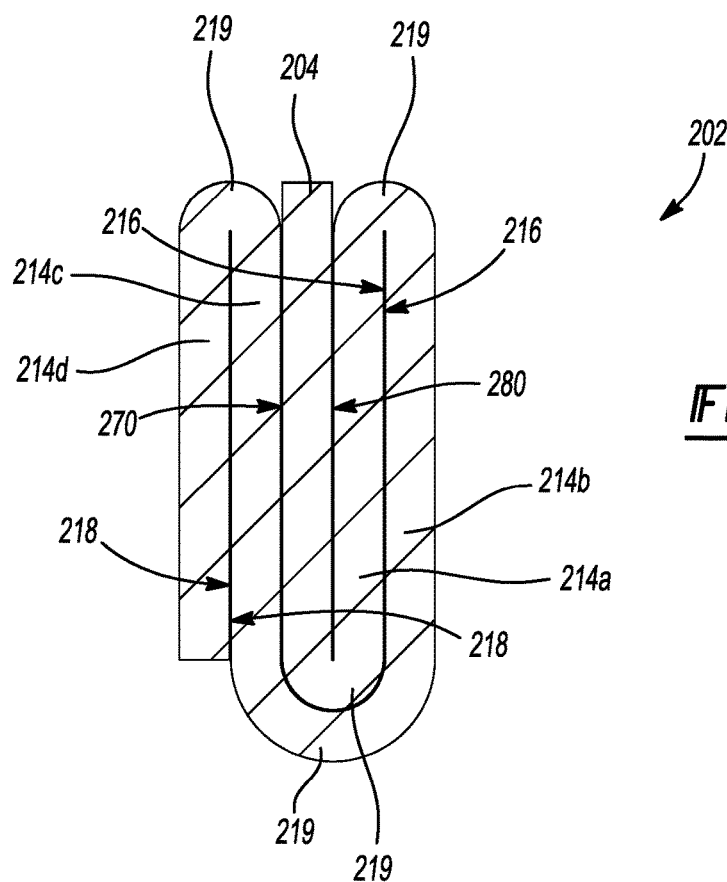
FIG. 7 is a cross-sectional end view of the exemplary mass damper shown in FIG. 4 taken along section line 7-7.
Figure 8:
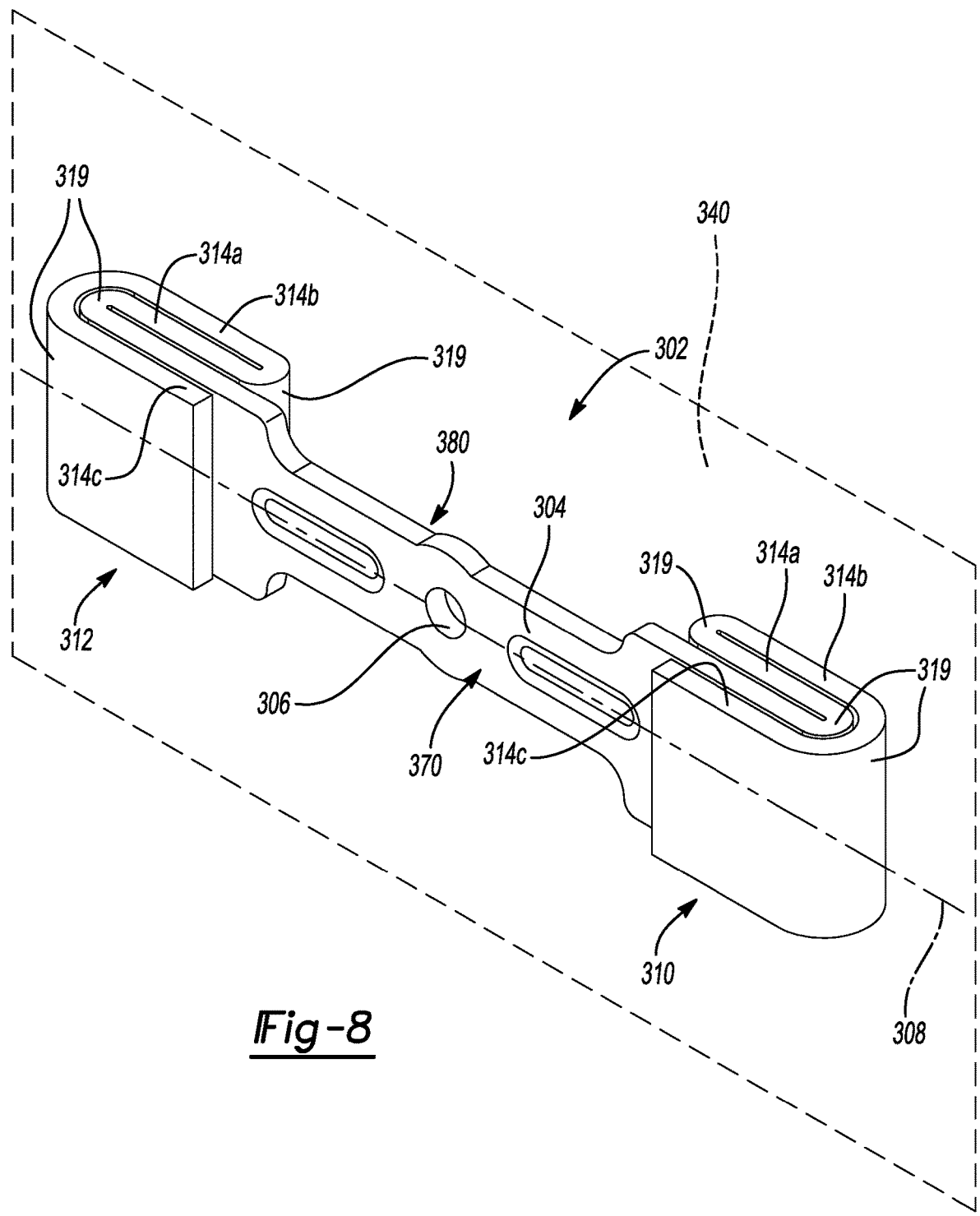
FIG. 8 is a side perspective view of another exemplary mass damper constructed in accordance with the teachings of the subject disclosure.
Figure 11:
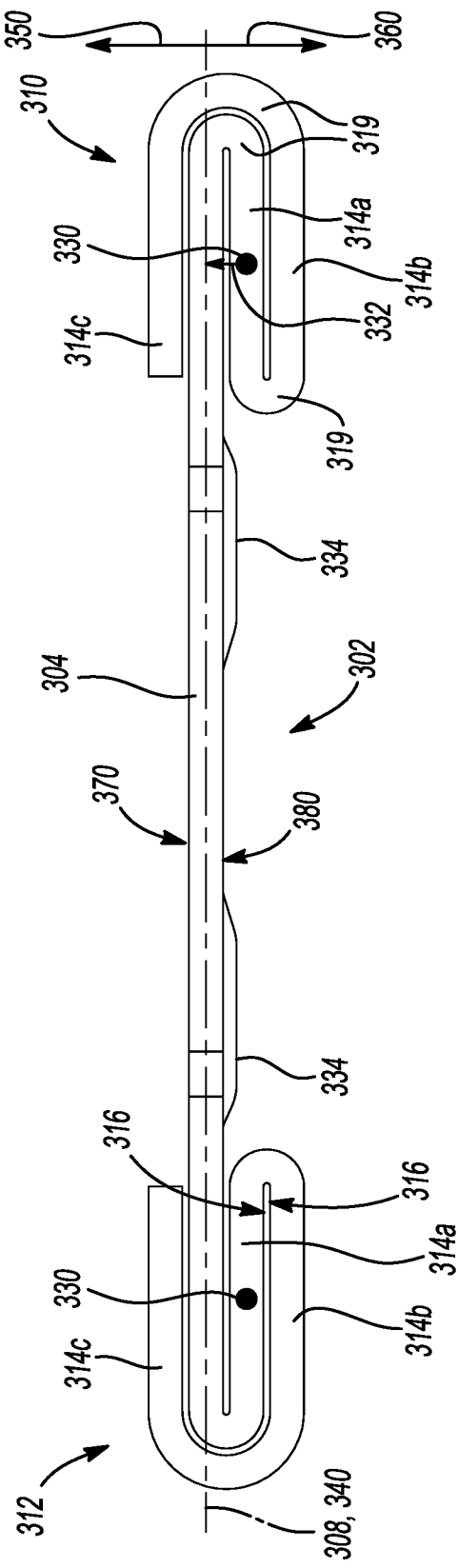
FIG. 11 is a top plan view of the exemplary mass damper shown in FIG. 9.
Figure 12:
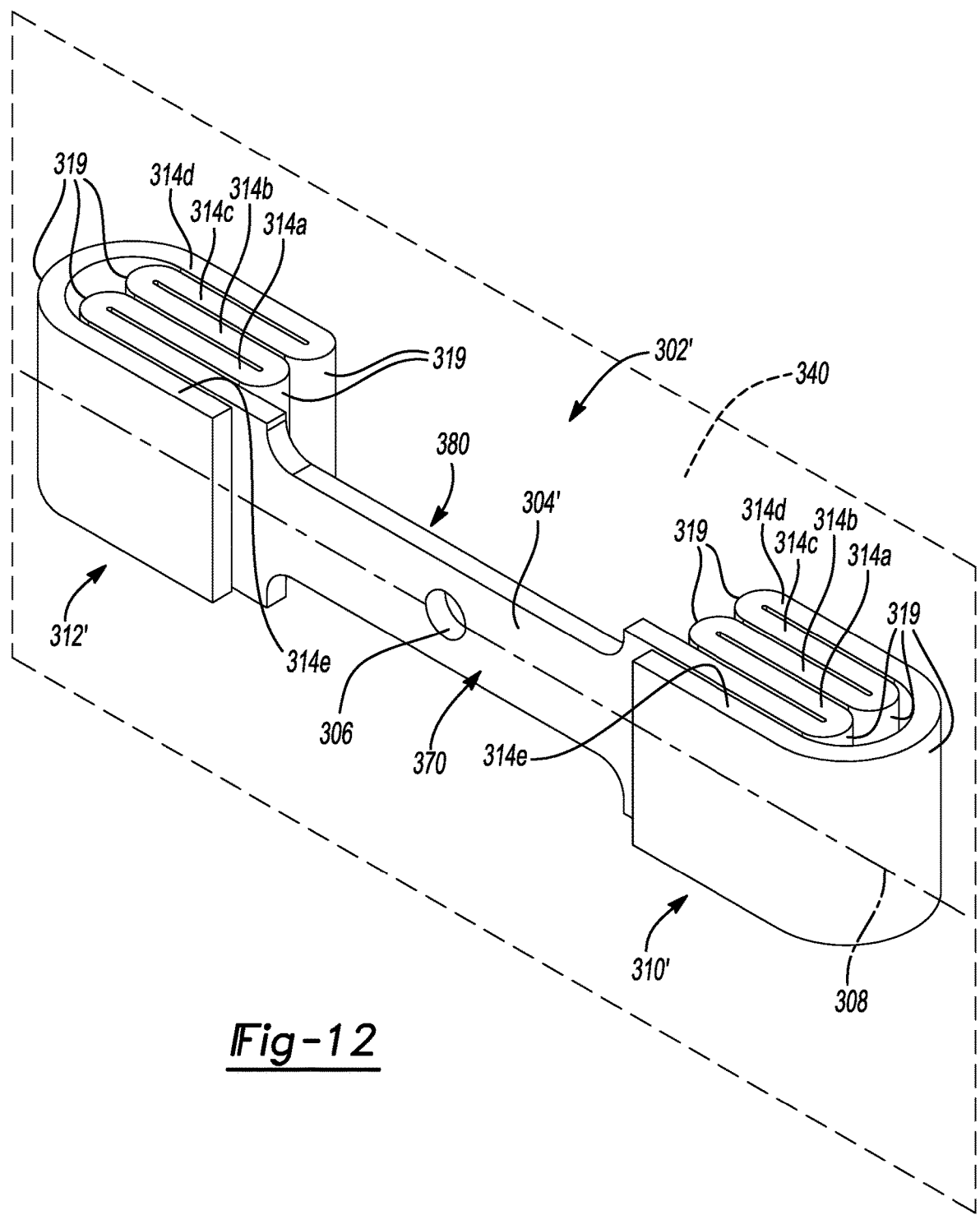
FIG. 12 is a side perspective view of another exemplary mass damper constructed in accordance with the teachings of the subject disclosure.
Figure 15:
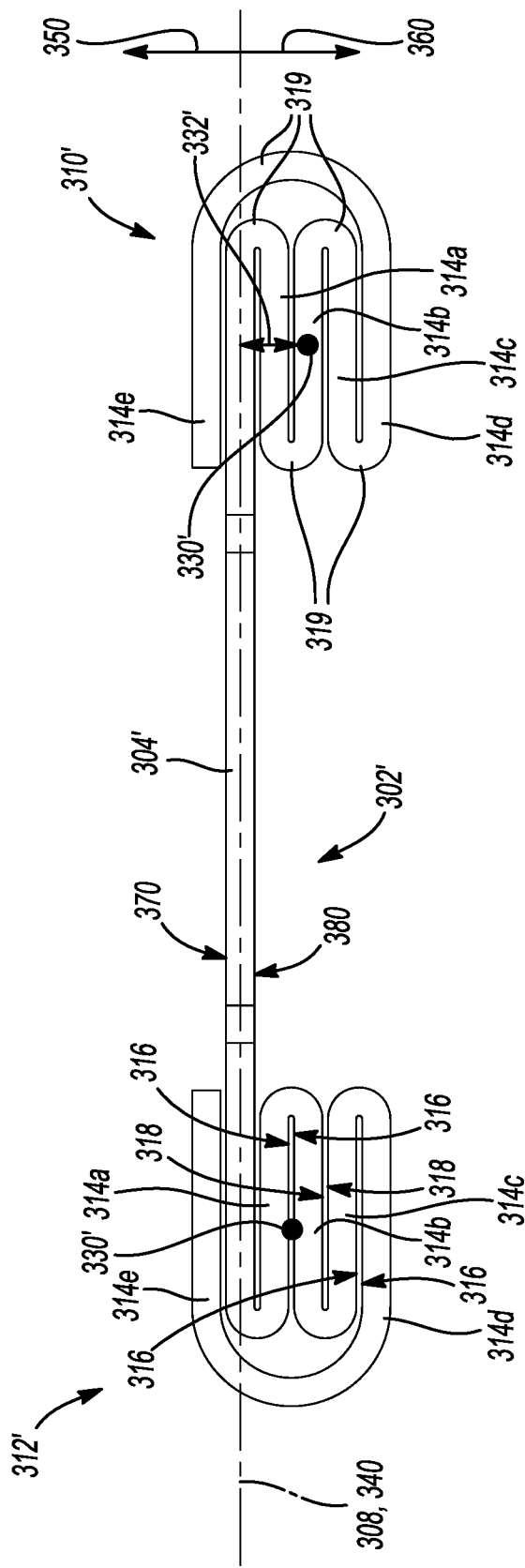
FIG. 15 is a top plan view of the exemplary mass damper shown in FIG. 12.
Figure 16:
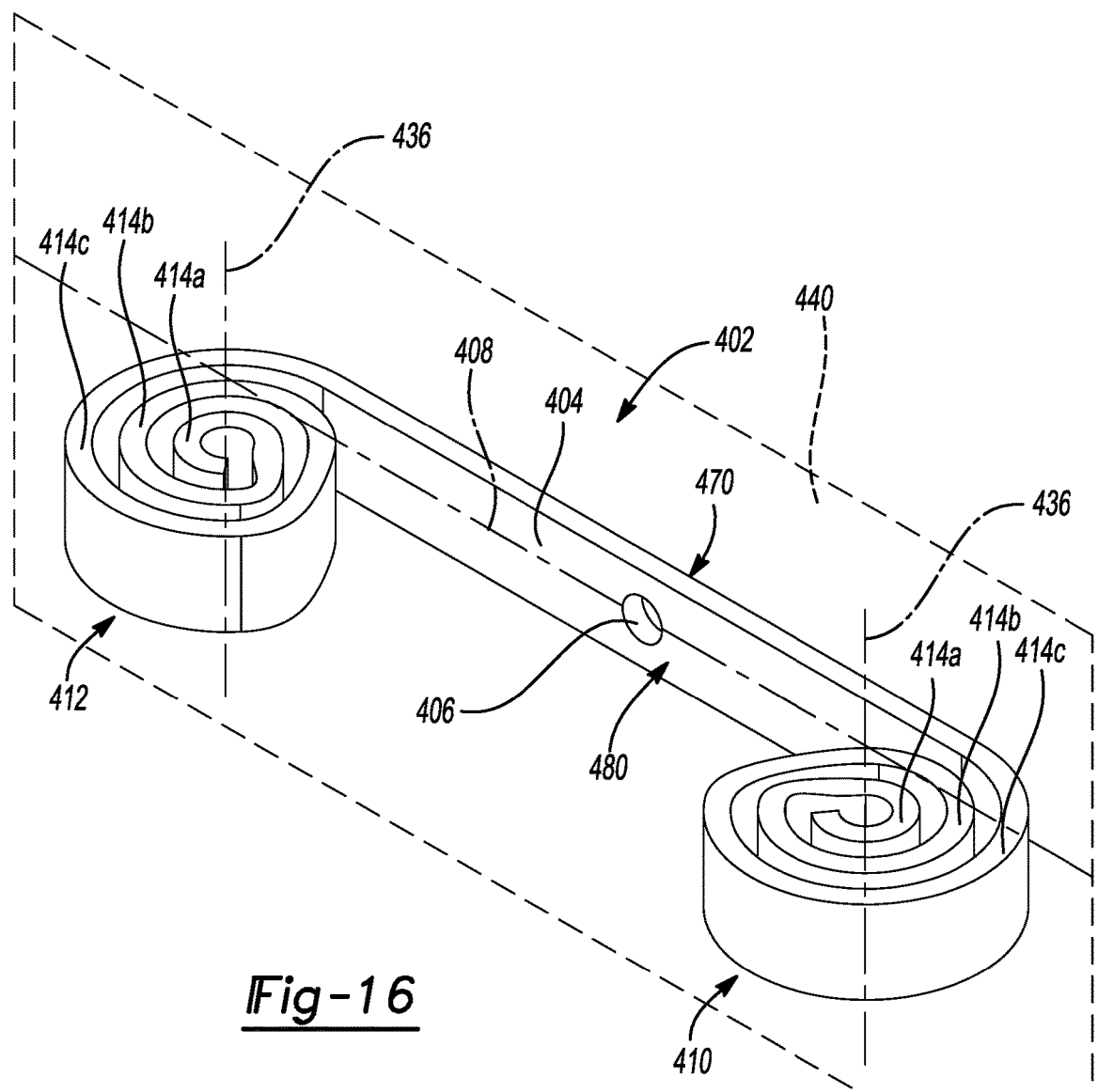
FIG. 16 is a side perspective view of another exemplary mass damper constructed in accordance with the teachings of the subject disclosure.
Figure 17:
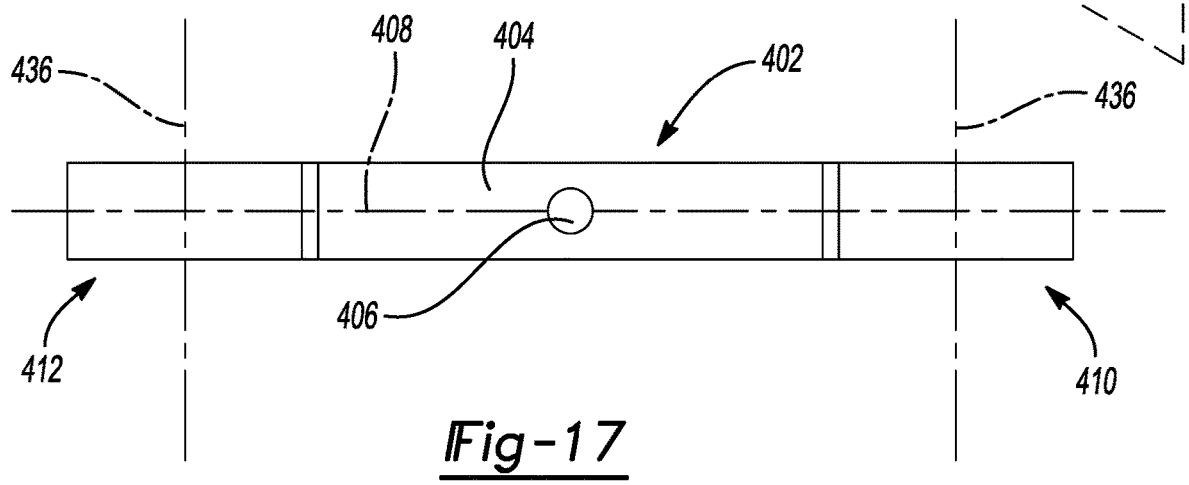
FIG. 17 is a side elevation view of the exemplary mass damper shown in FIG. 16.
Figure 18:
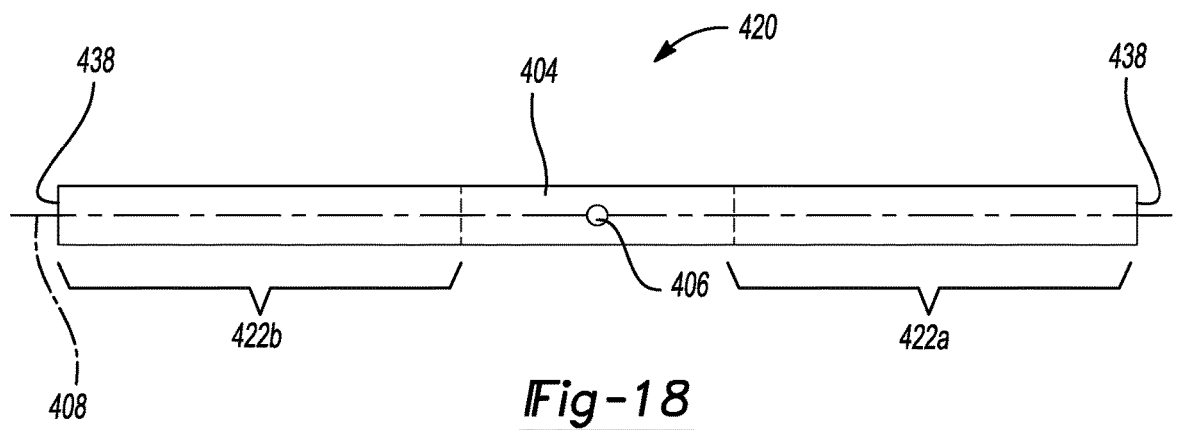
FIG. 18 is a side elevation view of an exemplary blank for the mass damper shown in FIG. 16 depicted before the first and second coiled ends are formed.
Figure 19:
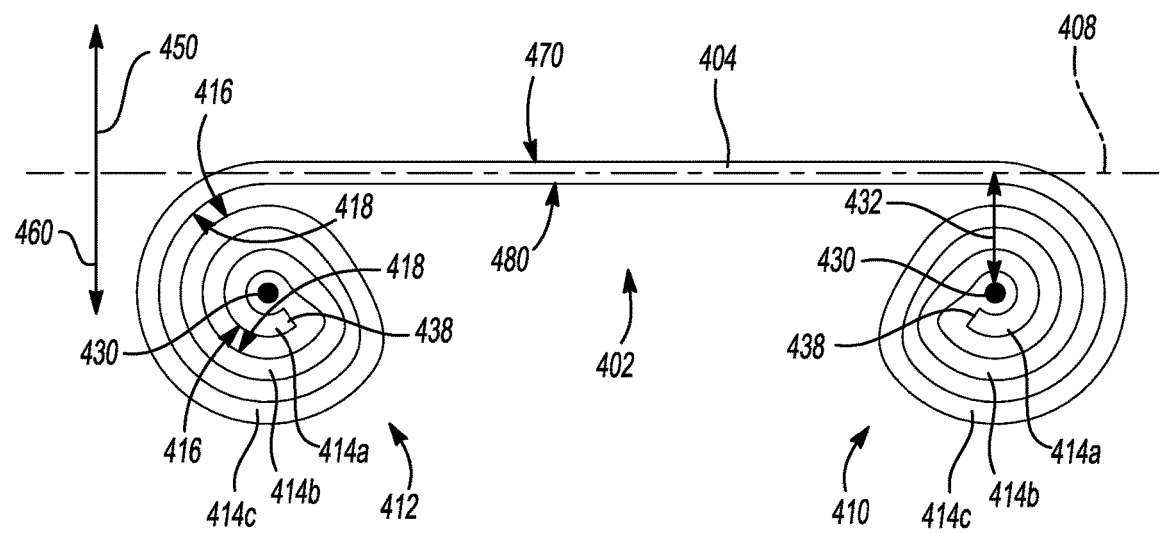
FIG. 19 is a top plan view of the exemplary mass damper shown in FIG. 16.
Figure 20:
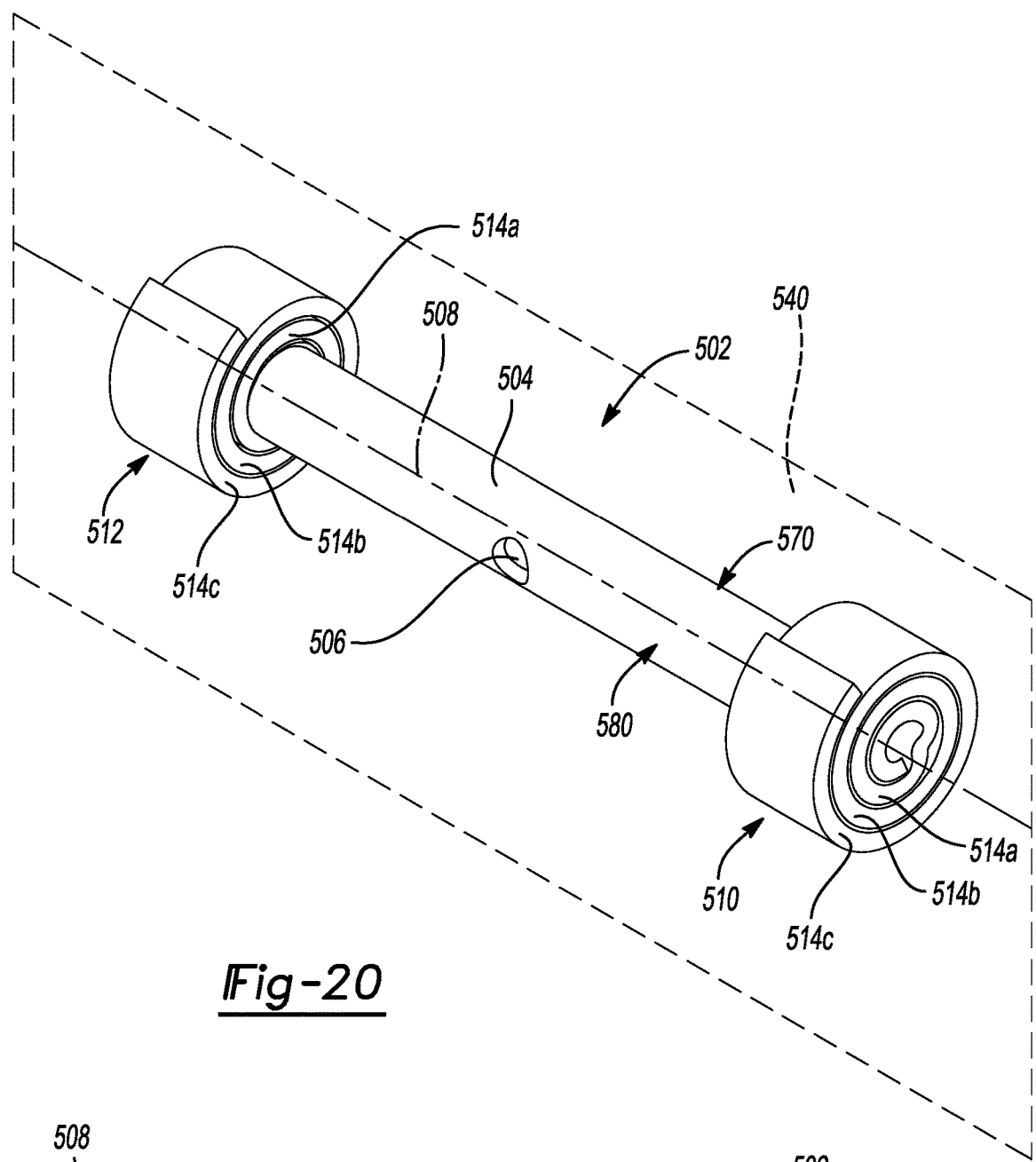
FIG. 20 is a side perspective view of another exemplary mass damper constructed in accordance with the teachings of the subject disclosure.
Figure 21:
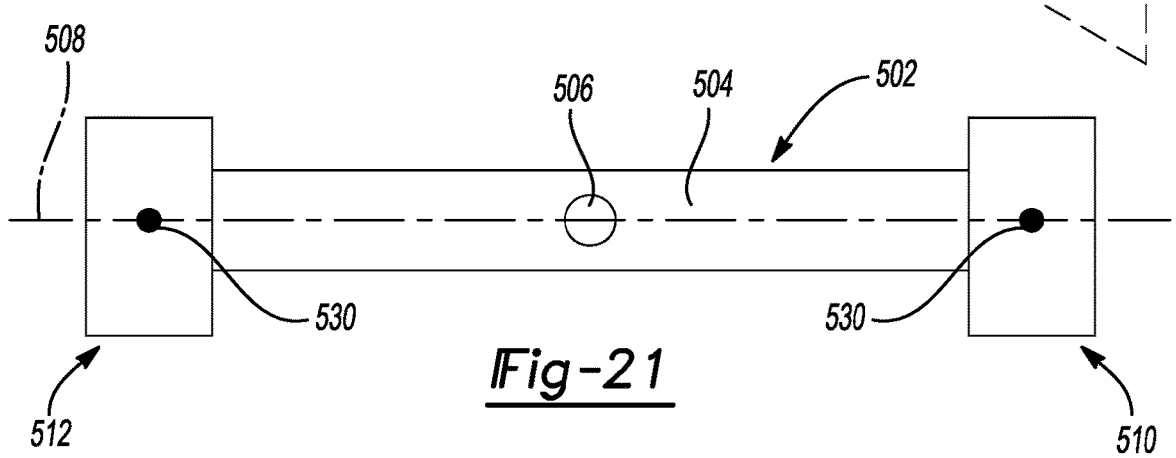
FIG. 21 is a side elevation view of the exemplary mass damper shown in FIG. 20.
Figure 22:
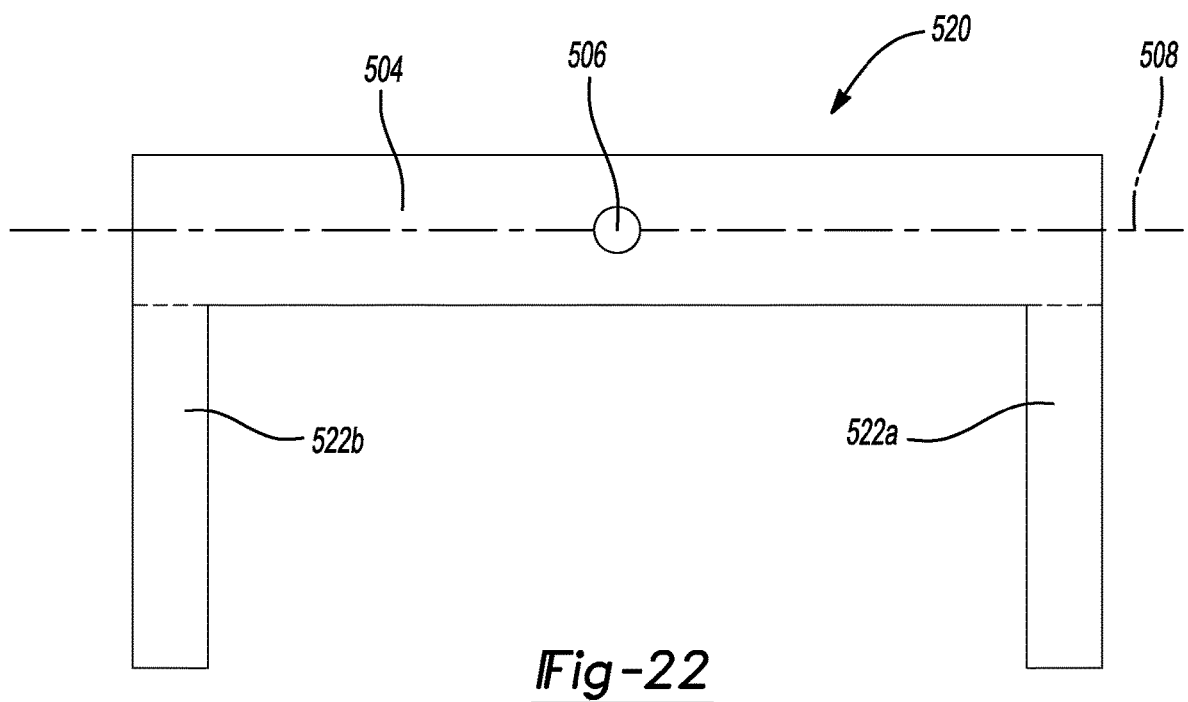
FIG. 22 is a side elevation view of an exemplary blank for the mass damper shown in FIG. 20 depicted before the first and second coiled ends are formed.
Figure 23:
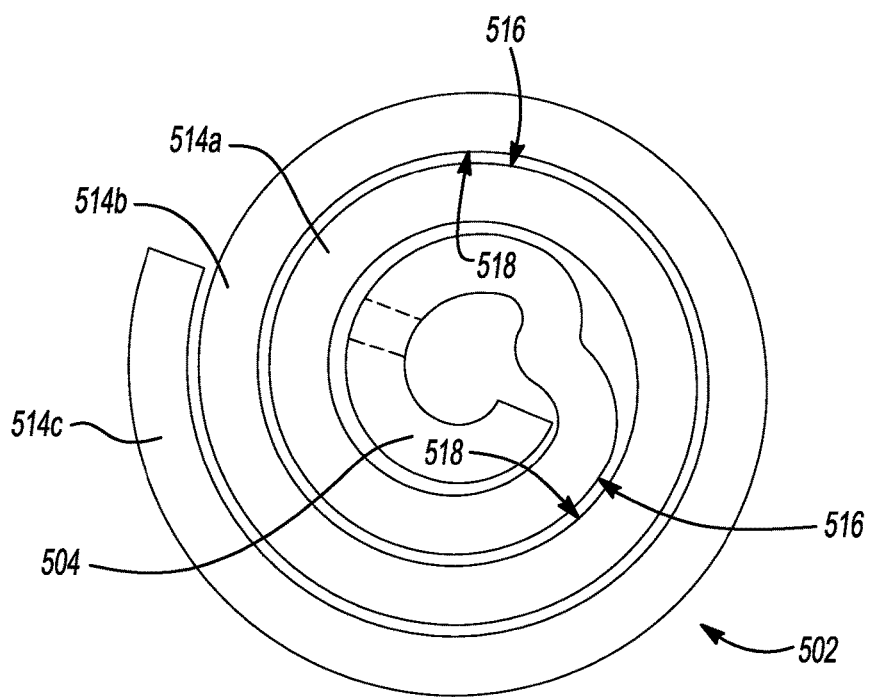
FIG. 23 is an end view of the exemplary mass damper shown in FIG. 20.
Figure 24:
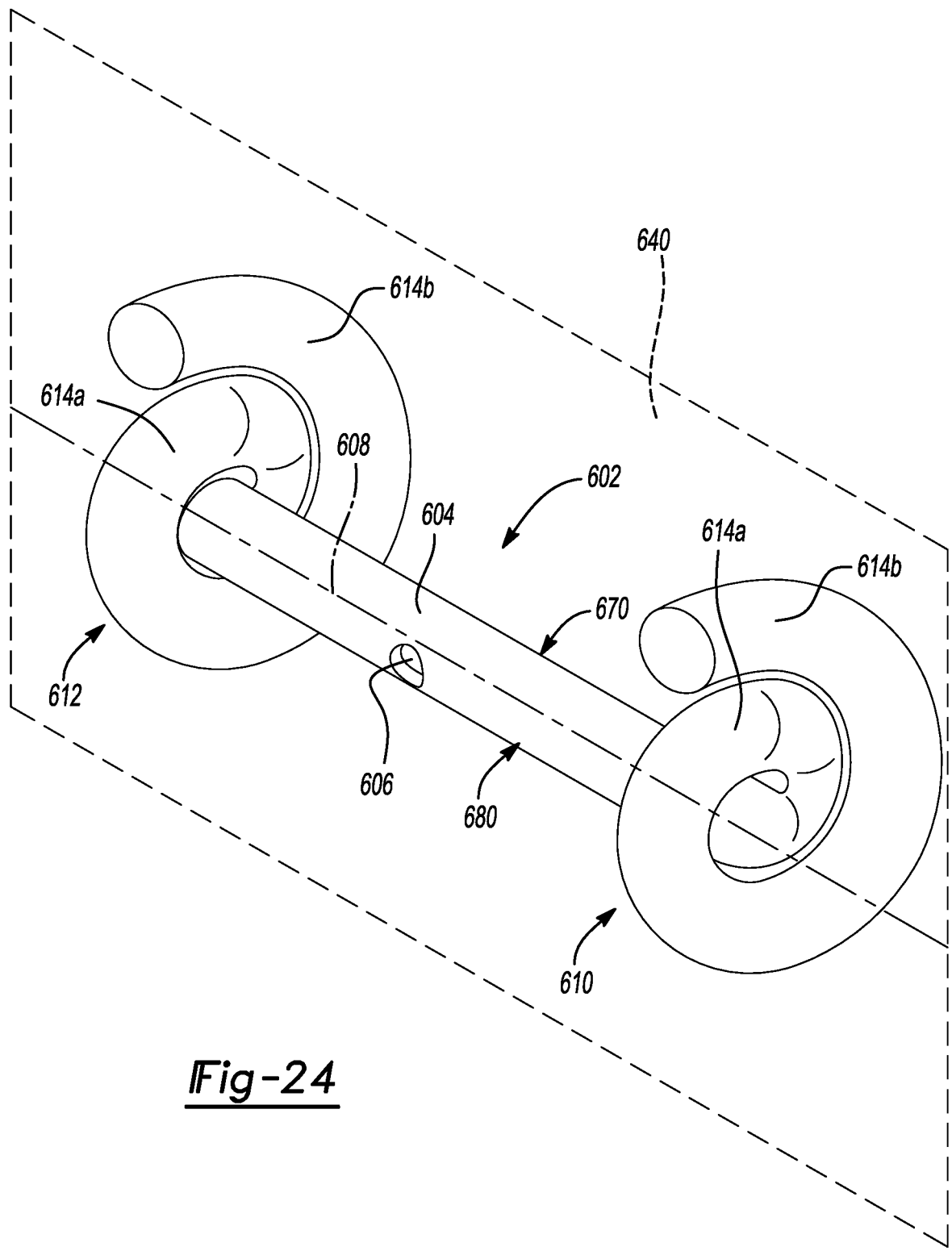
FIG. 24 is a side perspective view of another exemplary mass damper constructed in accordance with the teachings of the subject disclosure.
Figure 25:
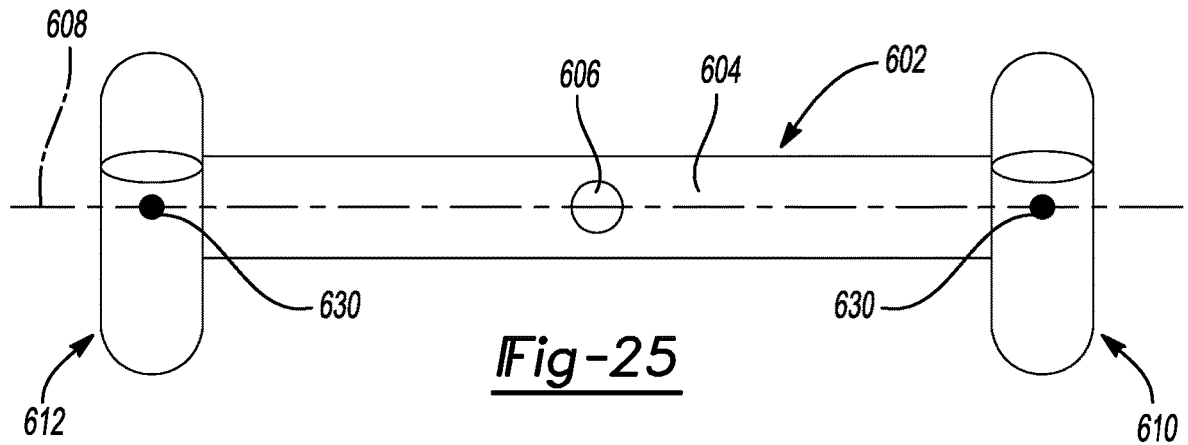
FIG. 25 is a side elevation view of the exemplary mass damper shown in FIG. 24.
Figure 26:
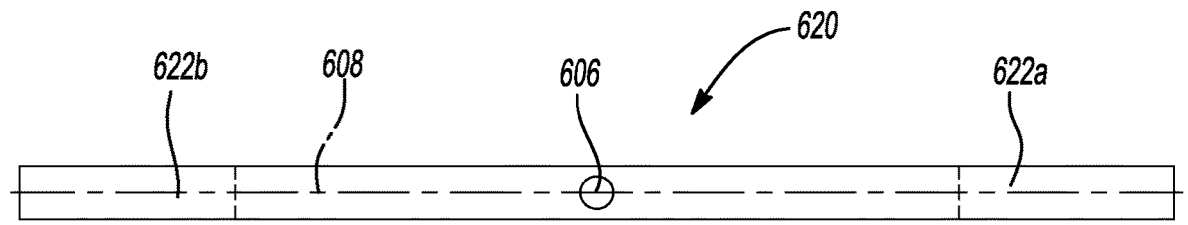
FIG. 26 is a side elevation view of an exemplary blank for the mass damper shown in FIG. 24 depicted before the first and second coiled ends are formed.
Figure 27:
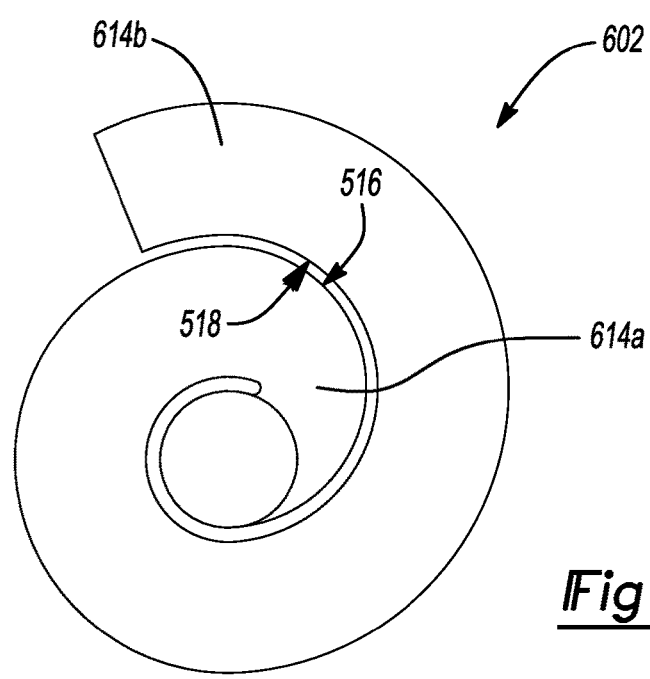
FIG. 27 is an end view of the exemplary mass damper shown in FIG. 24.

With reference to FIGS. 1 and 2, an exhaust system in the form of a muffler 10 is illustrated. The muffler 10 includes a conduit 100 and a snap action valve assembly 101. The conduit 100 extends inside the muffler 10 to define an exhaust passageway. The snap action valve assembly 101 is equipped with a mass damper 102, external to the conduit 100, that is mounted to a first end 103 of shaft 104. The shaft 104 extends through the conduit 100 from the first end 103 to a second end 105. A biasing member 106, also external to the conduit 100, extends between the second end 105 of shaft 104 and a mounting post 107 that is coupled to the conduit 100. The mass damper 102 is rotatably coupled to the shaft 104 such that the mass damper 102 rotates with the shaft 104. Although other configurations are possible, the biasing member 106 in the illustrated example is a coil spring.

The muffler 10 includes a housing 108 that is closed at either end by an output header 28 and an input header 30. The conduit 100 is positioned within the muffler 10 and extends completely through the housing 108 of the muffler 10. The conduit 100 includes a first plurality of perforations 109 and a second plurality of perforations 110. Inside the housing 108, a first internal partition 111 defines a first chamber 124 with the input header 130 and the housing 108. A second internal partition 113 defines a second chamber 122 in conjunction with the output header 128 and the housing 108. A middle chamber 120 is defined between the first and second internal partitions 111, 113 inside the housing 108. The first plurality of perforations 109 allow communication between exhaust flowing through the conduit 100 and the first chamber 124, which is filled with sound absorbing material 112 such as fiberglass roving. Similarly, the second plurality of perforations 110 in the conduit 100 provide fluid communication between the exhaust in the conduit 100 and the second chamber 122, which is filled with sound absorbing material 114. The middle chamber 120 is free from sound absorbing material. Openings 115 in the first internal partition 111 permit fluid communication between the first chamber 124 and the middle chamber 120, while openings 116 in the second partition 113 permit fluid communication of exhaust gases between the middle chamber 120 and the second chamber 122.

The snap action valve assembly 101 is housed in the middle chamber 120 and is therefore located between the first and second partitions 111 and 113. The snap action valve assembly 101 includes a valve flap 145 that is disposed within the exhaust passageway of the conduit 100 for controlling exhaust flow through the exhaust passageway. The shaft 104 supports the valve flap 145 in the exhaust passageway of the conduit 100. The valve flap 145 is rotatable inside the exhaust passageway of the conduit 100 about a pivot axis 130 between a closed position and an open position. The biasing member 106 biases the valve flap 145 towards the closed position. The valve flap 145 includes a vibration absorbing damper pad 126 about a portion of its periphery, which would normally be in contact with an interior surface of the conduit 100 in the closed position of the valve flap 145.

When the pressure of the exhaust flowing through the conduit 100 reaches a threshold value, the biasing force that the biasing member 106 applies to the snap action valve assembly 101 is overcome and the valve flap 145 rotates about the pivot axis 130 to the open position. The rotational motion of the valve flap 145 is smoothed by a braking action of the mass damper 102.

The mass damper 102 extends in a centerline plane 140. The centerline plane 140 is perpendicular to the pivot axis 130. An inward direction 150 that is parallel to the pivot axis 130 and transverse (i.e., perpendicular) to the centerline plane 140 extends from the centerline plane 140 towards the conduit 100. An outward direction 160 that is parallel to the pivot axis 130 and perpendicular to the centerline plane 140 extends from the centerline plane 140 away from the conduit 100. Accordingly, the inward direction 150 and the outward direction 160 point in opposite directions relative to the centerline plane 140 (i.e., the inward direction 150 and the outward direction 160 are arranged 180 degrees apart). The mass damper 102 includes an inboard side 170 that faces the conduit 100 and an outboard side 180 that faces away from the conduit 100. The centerline plane 140 bisects the mass damper 102 such that the inboard side 170 of the mass damper 102 is spaced from the centerline plane 140 in the inward direction 150 and the outboard side 180 of the mass damper 102 is spaced from the centerline plane 140 in the outward direction 160.

With reference to FIGS. 3-7, an exemplary mass damper 202 is illustrated. The mass damper 202 has a longitudinal segment 204 with a through-bore 206 that is configured to receive the second end 105 of shaft 104 for rotatably coupling the mass damper 202 to the second end 105 of the shaft 104. The longitudinal segment 204 extends linearly along a centerline axis 208 between first and second coiled ends 210, 212. The centerline axis 208 is arranged in a centerline plane 240 of the mass damper 202. The longitudinal segment 204 includes an inboard side 270 that is configured to face the conduit 100 and an outboard side 280 that is configured to face away from the conduit 100.

Each of the first and second coiled ends 210, 212 includes a series of overlapping layers 214a-d. In this embodiment, there are two layers 214a, 214b in the series of overlapping layers 214a-d that extend over (i.e., overlap with) the outboard side 280 of the longitudinal segment 204 at the first and second coiled ends 210, 212 and two layers 214c, 214d in the series of overlapping layers 214a-d that extend over (i.e., overlap with) the inboard side 270 of the longitudinal segment 204 at the first and second coiled ends 210, 212. As a result, the series of overlapping layers 214a-d at each of the first and second coiled ends 210, 212 includes two layers of material on each side of the centerline plane 240 (i.e., two layers 214a, 214b in the outward direction 260 relative to the centerline plane 240 and two layers 214c, 214d in the inward direction 250 relative to the centerline plane 240).

Each layer 214a-d in the series of overlapping layers 214a-d has a first side 216 and a second side 218. The series of overlapping layers 214a-d at each of the first and second coiled ends 210, 212 has a folded, serpentine shape where subsequent layers of material are folded back on themselves at bends 219 such that the first side 216 of layer 214a abuts the first side 216 of adjacent layer 214b and the second side 218 of layer 214c abuts the second side 218 of adjacent layer 214d.

The mass damper 202 may be formed using a variety of different manufacturing processes. By way of example and without limitation, the mass damper 202 may be formed from a stamped blank 220 (illustrated in FIG. 5). The series of overlapping layers 214a-d at each of the first and second coiled ends 210, 212 may be formed by folding end segments 222a, 222b along fold lines 224 to create the bends 219 shown in FIG. 7. The end segments 222a, 222b extend linearly along end segment axes 226a, 226b that are arranged at an oblique angle 228 relative to the centerline axis 208. By way of example and without limitation, the oblique angle 228 may range from 60 to 70 degrees. As a result, each of the first and second coiled ends 210, 212 has a center of gravity 230 that is located in the centerline plane 240 of the mass damper 202, but spaced from the centerline axis 208 by an off-set distance 232.

Although the mass and inertial parameters of the mass damper 202 are application specific, the inventors have found the following parameters of the mass damper 202 to be suitable for use in the snap-action valve assembly 101. Together, the longitudinal segment 204 and the first and second coiled ends 210, 212 create a distributed mass around the through-bore 206 (i.e., around the pivot axis 130) of 150 to 180 grams (g) and an inertial value that is greater than 300,000 gram-square millimeters (g-mm$^2$). A wide variety of different materials can be used for the mass damper 202. By way of non-limiting example, the mass damper 202 may be made of metal, such as iron, steel, or stainless steel. The material undergoes plastic deformation at the bends 219 during the bending/folding manufacturing process such that the series of overlapping layers 214a-d are permanent and do not unwind/unfold. However, if unwinding/unfolding is a problem, a spot weld can be applied through the series of overlapping layers 214a-d to hold them together more securely.

By creating added mass with the first and second coiled ends 210, 212, a stamped blank 220 with less overall thickness can be used to achieve inertial values greater than 300,000 gram-square millimeters (g-mm$^2$). As a result, lighter and less expensive (i.e., light duty) stamping equipment can be utilized to stamp the blank 220. This results in a cost savings of approximately 10-15 cents per part (i.e., per mass damper 202) compared to other mass damper designs. Optionally, stiffening ribs 234 can be added to the longitudinal segment 204 in the form of longitudinally extending depressions to increase the strength of the longitudinal segment 204 for any given thickness of the blank 220.

With reference to FIGS. 8-11, another exemplary mass damper 302 is illustrated. The mass damper 302 has a longitudinal segment 304 with a through-bore 306 that is configured to receive the second end 105 of shaft 104 for rotatably coupling the mass damper 302 to the second end 105 of the shaft 104. The longitudinal segment 304 extends linearly along a centerline axis 308 between first and second coiled ends 310, 312. The centerline axis 308 is arranged in a centerline plane 340 of the mass damper 302. The longitudinal segment 304 includes an inboard side 370 that is configured to face the conduit 100 and an outboard side 380 that is configured to face away from the conduit 100.

Each of the first and second coiled ends 310, 312 includes a series of three overlapping layers 314a-c. In this embodiment, there are two layers 314a-b in the series of overlapping layers 314a-c that extend over (i.e., overlap with) the outboard side 380 of the longitudinal segment 304 at the first and second coiled ends 310, 312 and one layer 314c in the series of overlapping layers 314a-c that extends over (i.e., overlaps with) the inboard side 370 of the longitudinal segment 304 at the first and second coiled ends 310, 312 to lock the series of overlapping layers 314a-c in place and prevent unwinding/unfolding. As a result, the series of overlapping layers 314a-c at each of the first and second coiled ends 310, 312 includes two layers 314a-b in the outward direction 360 relative to the centerline plane 340 and one layer 314c in the inward direction 350 relative to the centerline plane 340).

Each layer 314a-c in the series of overlapping layers 314a-c has a first side 316 and a second side 318. The series of overlapping layers 314a-c at each of the first and second coiled ends 310, 312 has a folded, serpentine shape where subsequent layers of material are folded back on themselves at bends 319 such that the first side 316 of layer 314a abuts the first side 316 of adjacent layer 314b.

The mass damper 302 may be formed using a variety of different manufacturing processes. By way of example and without limitation, the mass damper 302 may be formed from a stamped blank 320 (illustrated in FIG. 10). The series of overlapping layers 314a-d at each of the first and second coiled ends 310, 312 may be formed by folding end segments 322a, 322b along fold lines 324 to create the bends 319 shown in FIG. 11. The end segments 322a, 322b extend linearly along the centerline axis 308. As a result, each of the first and second coiled ends 310, 312 has a center of gravity 330 that is spaced from the centerline plane 340 of the mass damper 302 in the outward direction 360 by an off-set distance 332. Alternatively, the mass damper 302 could be mounted to the shaft 104 in the opposite orientation such that the center of gravity 330 of each of the first and second coiled ends 310, 312 is spaced from the centerline plane 340 of the mass damper 302 in the inward direction 350. Stiffening ribs 334 can be added to the longitudinal segment 304 in the form of longitudinally extending depressions to increase the strength of the longitudinal segment 304 for any given thickness of the blank 320.

With reference to FIGS. 12-15, another exemplary mass damper 302' is illustrated. The mass damper 302' shown in FIGS. 12-15 is similar to the mass damper 302 shown in FIGS. 8-11 except that mass damper 302' has a longitudinal segment 304' with a different shape and first and second coiled ends 310', 312' that each includes a series of five overlapping layers 314a-e. In this embodiment, there are four layers 314a-d in the series of overlapping layers 314a-e that extend over (i.e., overlap with) the outboard side 380 of the longitudinal segment 304' at the first and second coiled ends 310', 312' and one layer 314e in the series of overlapping layers 314a-e that extends over (i.e., overlaps with) the inboard side 370 of the longitudinal segment 304' at the first and second coiled ends 310', 312' to lock the series of overlapping layers 314a-e in place and prevent unwinding/unfolding. As a result, the series of overlapping layers 314a-e at each of the first and second coiled ends 310', 312' includes four layers 314a-d in the outward direction 360 relative to the centerline plane 340 and one layer 314e in the inward direction 350 relative to the centerline plane 340).

Each layer 314a-e in the series of overlapping layers 314a-e has a first side 316 and a second side 318. The series of overlapping layers 314a-e at each of the first and second coiled ends 310', 312' has a folded, serpentine shape where subsequent layers of material are folded back on themselves at bends 319 such that the first side 316 of layer 314a abuts the first side 316 of adjacent layer 314b, the second side 318 of layer 314b abuts the second side 318 of adjacent layer 314c, and the first side 316 of layer 314c abuts the first side 316 of layer 314d.

The mass damper 302' may be formed from a stamped blank 320' (illustrated in FIG. 14). The series of overlapping layers 314a-d at each of the first and second coiled ends 310', 312' may be formed by folding end segments 322a', 322b' along fold lines 324 to create the bends 319 shown in FIG. 15. As a result, each of the first and second coiled ends 310', 312' has a center of gravity 330' that is spaced from the centerline plane 340 of the mass damper 302' in the outward direction 360 by an off-set distance 332'. It should be appreciated that the off-set distance 332' for the mass damper 302' shown in FIGS. 12-15 is smaller than the off-set distance 332 for mass damper 302 shown in FIGS. 8-11.

With reference to FIGS. 16-19, another exemplary mass damper 402 is illustrated. The mass damper 402 has a longitudinal segment 404 with a through-bore 406 that is configured to receive the second end 105 of shaft 104 for rotatably coupling the mass damper 402 to the second end 105 of the shaft 104. The longitudinal segment 404 extends linearly along a centerline axis 408 between first and second coiled ends 410, 412. The centerline axis 408 is arranged in a centerline plane 440 of the mass damper 402. The longitudinal segment 404 includes an inboard side 470 that is configured to face the conduit 100 and an outboard side 480 that is configured to face away from the conduit 100.

Each of the first and second coiled ends 410, 412 includes a series of overlapping layers 414a-c. Each layer 414a-c in the series of overlapping layers 414a-c has a first side 416 and a second side 418. The series of overlapping layers 414a-c at each of the first and second coiled ends 410, 412 has a spiral shape such that the first side 416 of layer 414a abuts the second side 418 of adjacent layer 414b and the first side 416 of layer 414b abuts the second side 418 of adjacent layer 414c. The series of overlapping layers 414a-c at each of the first and second coiled ends 410, 412 spiral around central axes 436 that are parallel to and spaced from the centerline plane 440.

The mass damper 402 may be formed using a variety of different manufacturing processes. By way of example and without limitation, the mass damper 402 may be formed from a stamped blank 420 (illustrated in FIG. 18). The series of overlapping layers 414a-c at each of the first and second coiled ends 410, 412 may be formed by rolling end segments 422a, 422b about ends 438 to create the spiral structure shown in FIG. 19. The end segments 422a, 422b extend linearly along the centerline axis 408. As a result, each of the first and second coiled ends 410, 412 has a center of gravity 430 that is spaced from the centerline plane 440 of the mass damper 402 in the outward direction 460 by an off-set distance 432. Alternatively, the mass damper 402 could be mounted to the shaft 104 in the opposite orientation such that the center of gravity 430 of each of the first and second coiled ends 410, 412 is spaced from the centerline plane 440 of the mass damper 402 in the inward direction 450.

With reference to FIGS. 20-23, another exemplary mass damper 502 is illustrated. The mass damper 502 has a longitudinal segment 504 with a through-bore 506 that is configured to receive the second end 105 of shaft 104 for rotatably coupling the mass damper 502 to the second end 105 of the shaft 104. The longitudinal segment 504 has a cylindrical shape and extends linearly along a centerline axis 508 between first and second coiled ends 510, 512. The centerline axis 508 is arranged in a centerline plane 540 of the mass damper 502. The longitudinal segment 504 includes an inboard side 570 (i.e., inboard half) that is configured to face the conduit 100 and an outboard side 580 (i.e., outboard half) that is configured to face away from the conduit 100.

Each of the first and second coiled ends 510, 512 includes a series of overlapping layers 514*a-c*. Each layer 514*a-c* in the series of overlapping layers 514*a-c* has a first side 516 and a second side 518. The series of overlapping layers 514*a-c* at each of the first and second coiled ends 510, 512 has a spiral shape such that the first side 516 of layer 514*a* abuts the second side 518 of adjacent layer 514*b* and the first side 516 of layer 514*b* abuts the second side 518 of adjacent layer 514*c*. The series of overlapping layers 514*a-c* at each of the first and second coiled ends 510, 512 spiral around the centerline axis 508 of the longitudinal segment 504.

The mass damper 502 may be formed using a variety of different manufacturing processes. By way of example and without limitation, the mass damper 502 may be formed from a flat blank 520 that includes a longitudinal segment 504 and two end segments 522*a*, 522*b* (illustrated in FIG. 22). The blank 520 initially starts out with a U-like shape where the end segments 522*a*, 522*b* extend perpendicularly from the longitudinal segment 504. The longitudinal segment 504 is first rolled into a cylindrical shape such that it has a hollow, circular cross-section. Then the series of overlapping layers 514*a-c* at each of the first and second coiled ends 510, 512 is formed by rolling end segments 522*a*, 522*b* about the ends of the longitudinal segment 504 to create the spiral structure shown in FIG. 23. In other words, the end segments 522*a*, 522*b* are wrapped around the ends of longitudinal segment 504. Each of the first and second coiled ends 510, 512 has a center of gravity 530 that is positioned along the centerline axis 508. It should be appreciated that other configurations are also possible where the longitudinal segment 504 is bent into an hollow, oval-shaped cross-section or, alternatively, kept as a flat segment with a solid, rectangular cross-section.

With reference to FIGS. 24-27, another exemplary mass damper 602 is illustrated. The mass damper 602 has a longitudinal segment 604 with a through-bore 606 that is configured to receive the second end 105 of shaft 104 for rotatably coupling the mass damper 602 to the second end 105 of the shaft 104. The longitudinal segment 604 has a cylindrical, rod-like shape and extends linearly along a centerline axis 608 between first and second coiled ends 610, 612. The centerline axis 608 is arranged in a centerline plane 640 of the mass damper 602. The longitudinal segment 604 includes an inboard side 670 (i.e., inboard half) that is configured to face the conduit 100 and an outboard side 680 (i.e., outboard half) that is configured to face away from the conduit 100. Optionally, a center portion of the longitudinal segment 604 may be stamped to provide flats on the inboard and outboard sides 670, 680 adjacent to the through-bore 606.

Each of the first and second coiled ends 610, 612 includes a series of overlapping layers 614*a-b*. Each layer 614*a-b* in the series of overlapping layers 614*a-b* has a first side 616 and a second side 618. The series of overlapping layers 614*a-b* at each of the first and second coiled ends 610, 612 has a spiral shape such that the first side 616 of layer 614*a* abuts the second side 618 of adjacent layer 614*b*. The series of overlapping layers 614*a-b* at each of the first and second coiled ends 610, 612 spiral around the centerline axis 608 of the longitudinal segment 604.

The mass damper 602 may be formed using a variety of different manufacturing processes. By way of example and without limitation, the mass damper 602 may be formed from a straight cylindrical rod 620 that has a solid, circular cross-section (illustrated in FIG. 26). The series of overlapping layers 614*a-b* at each of the first and second coiled ends 610, 612 is formed by bending the ends 622*a*, 622*b* of the rod 620 into the spiral structure shown in FIG. 27. Each of the first and second coiled ends 610, 612 has a center of gravity 630 that is positioned along the centerline axis 608.

Figure 28:
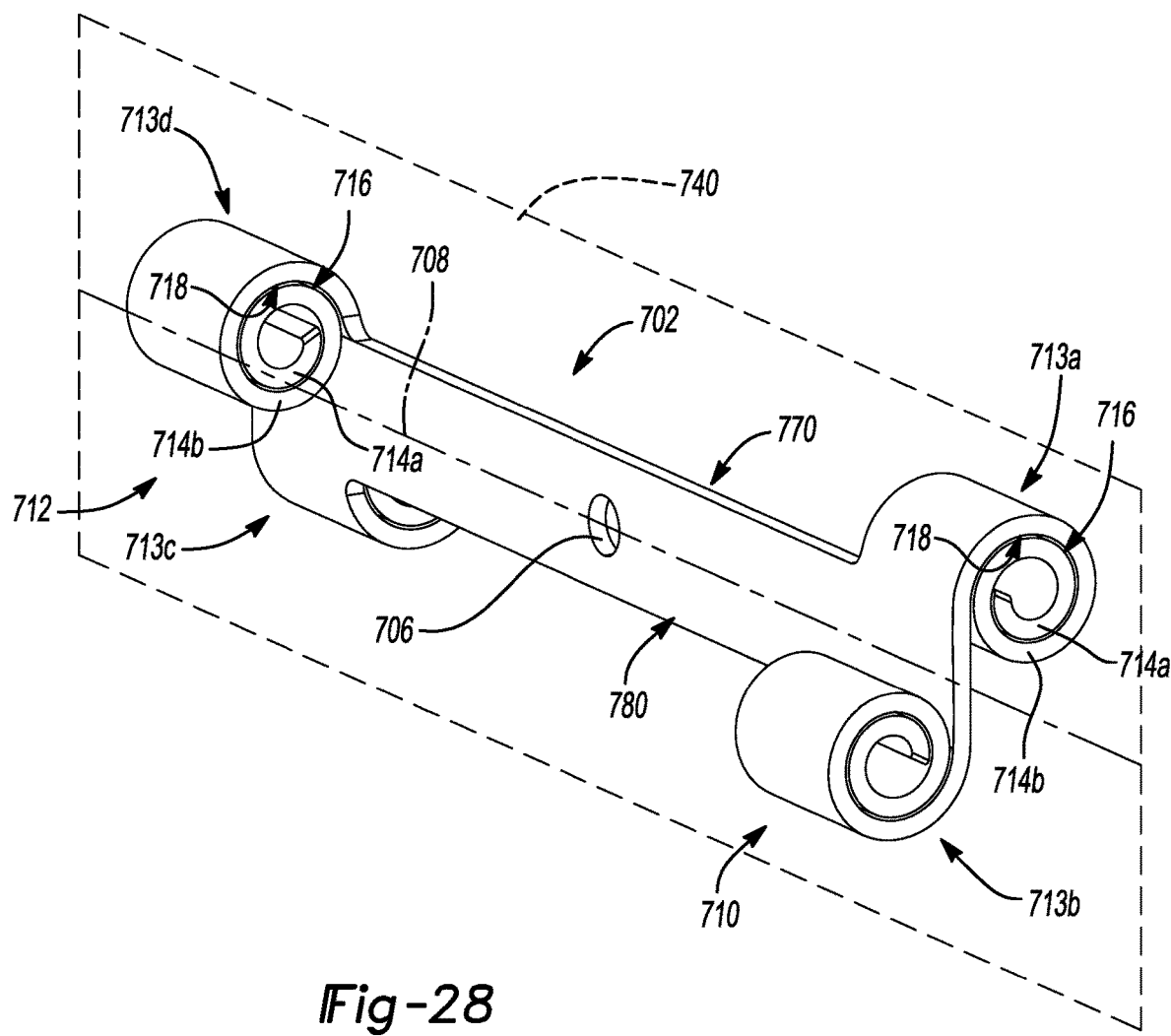
FIG. 28 is a side perspective view of another exemplary mass damper constructed in accordance with the teachings of the subject disclosure.
Figure 29:
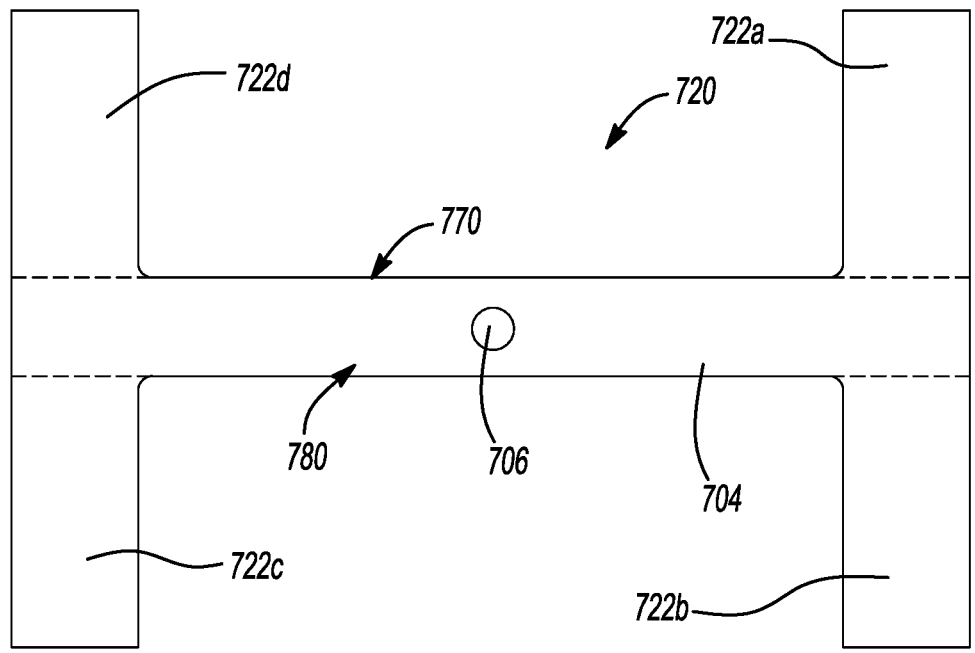
FIG. 29 is a side elevation view of an exemplary blank for the mass damper shown in FIG. 28 depicted before the first and second coiled ends are formed.
Figure 30:
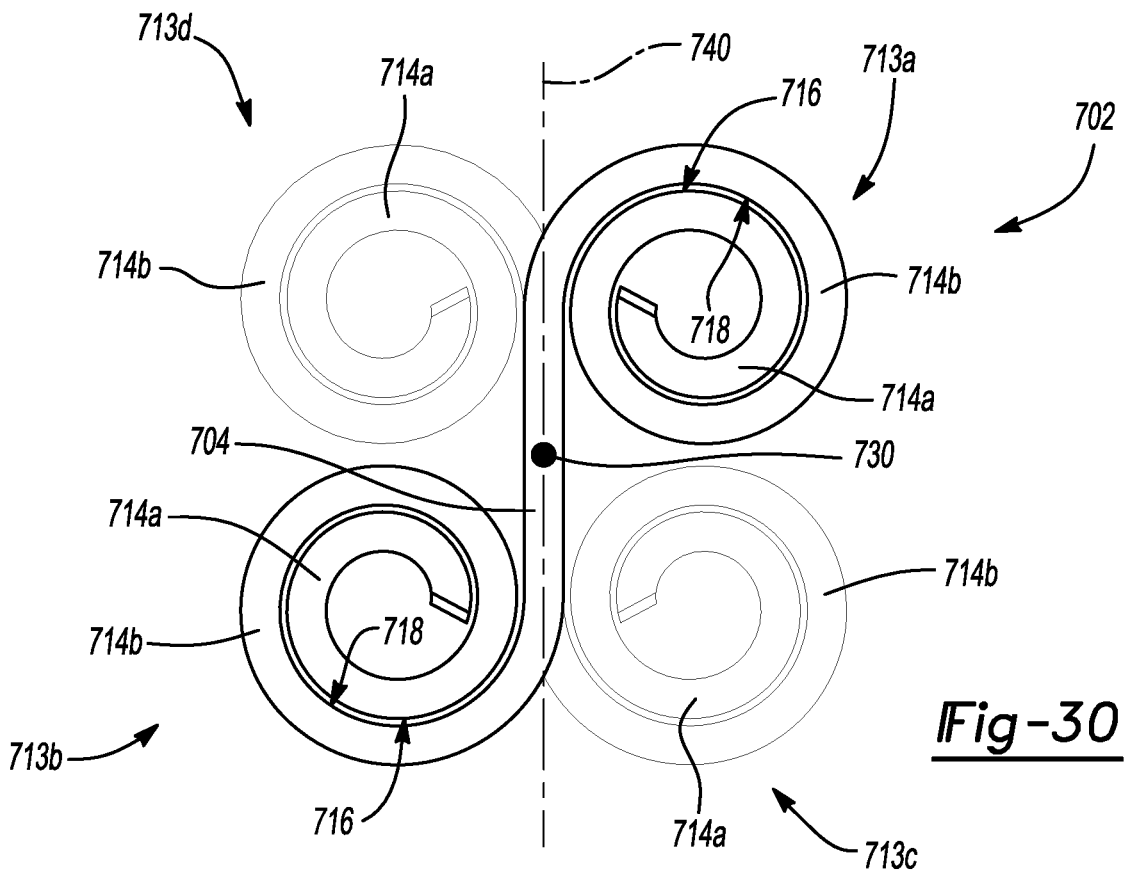
FIG. 30 is an end view of the exemplary mass damper shown in FIG. 28.

With reference to FIGS. 28-30, another exemplary mass damper 702 is illustrated. The mass damper 702 has a longitudinal segment 704 with a through-bore 706 that is configured to receive the second end 105 of shaft 104 for rotatably coupling the mass damper 702 to the second end 105 of the shaft 104. The longitudinal segment 704 is flat, has a solid rectangular cross-section, and extends linearly along a centerline axis 708 between first and second coiled ends 710, 712. The centerline axis 708 is arranged in a centerline plane 740 of the mass damper 702. The longitudinal segment 704 includes an inboard side 770 that is configured to face the conduit 100 and an outboard side 780 that is configured to face away from the conduit 100.

The first coiled end 710 includes two oppositely wound spiral structures 713*a*, 713*b* and the second coiled end 712 includes another two oppositely wound spiral structures 713*c*, 713*d*. Spiral structures 713*a* and 713*c* are positioned inboard of the centerline plane 740 and spiral structures 713*b* and 713*d* are positioned outboard of the centerline plane 740. Each of the spiral structures 713*a-d* includes a series of overlapping layers 714*a-b*. Each layer 714*a-b* in the series of overlapping layers 714*a-b* has a first side 716 and a second side 718, where the first side 716 of layer 714*a* abuts the second side 718 of adjacent layer 714*b*.

The mass damper 702 may be formed using a variety of different manufacturing processes. By way of example and without limitation, the mass damper 702 may be formed from a flat blank 720 that includes a longitudinal segment 704 and four end segments 722*a-d* (illustrated in FIG. 29). The blank 720 initially starts out with an H-like shape where the end segments 722*a-d* extend perpendicularly from the longitudinal segment 704. Spiral structures 713*a* and 713*c* are formed by rolling end segments 722*a* and 722*c* over the inboard side 770 of the longitudinal segment 704. Spiral structures 713*b* and 713*d* are rolled/wound in the opposite direction. Spiral structures 713*b* and 713*d* are formed by rolling end segments 722*b* and 722*d* over the outboard side 780 of the longitudinal segment 704. Because the weight of spiral structures 713*a* and 713*b* off-set each other at the first coiled end 710 and because the weight of spiral structures 713*a* and 713*b* off-set each other at the second coiled end 712, each of the first and second coiled ends 710, 712 has a center of gravity 730 that is positioned along the centerline axis 708.

The mass dampers 102, 202, 302, 302', 402, 502, 602, 702 described above with reference to FIGS. 1-30 provide a simple mass that is rotatably coupled to shaft 104 for the purpose of damping vibrations present in the snap-action valve assembly 101. The mass dampers 102, 202, 302, 302', 402, 502, 602, 702 may be rotatably coupled to the shaft 104 in numerous ways. By way of non-limiting example, the mass dampers 102, 202, 302, 302', 402, 502, 602, 702 may be welded to the second end 105 of the shaft 104, threaded onto the second end 105 of the shaft 104, or coupled to the second end 105 of the shaft 104 using a fastener (not shown) or an adhesive. The various embodiments of mass dampers 102, 202, 302, 302', 402, 502, 602, 702 disclosed add braking mass to the valve flap 150 to reduce the amplitude of the resonant vibration of the valve flap 150 and biasing member 106.

The foregoing description of the embodiments has been provided for purposes of illustration and description. It is not intended to be exhaustive or to limit the subject disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A snap-action valve assembly for an exhaust system, comprising:
    a conduit defining an exhaust passageway therein;
    a valve flap disposed within said exhaust passageway for controlling exhaust flow through said exhaust passageway;
    a shaft supporting said valve flap in said exhaust passageway for rotation about a pivot axis;
    a mass damper external to said conduit that is rotatably coupled to said shaft such that said mass damper rotates with said shaft, said mass damper including a longitudinal segment coupled to said shaft that extends between first and second coiled ends;
    said longitudinal segment including an inboard side that faces said conduit and an outboard side that faces away from said conduit; and
    said first and second coiled ends including a series of overlapping layers, at least one layer in said series of overlapping layers extending over a portion of said inboard side of said longitudinal segment at said first and second coiled ends, and at least one layer in said series of overlapping layers extending over a portion of said outboard side of said longitudinal segment at said first and second coiled ends.

2. The snap-action valve assembly of claim 1, wherein said longitudinal segment of said mass damper extends in a centerline plane of said mass damper that is transverse to said pivot axis.

3. The snap-action valve assembly of claim 2, wherein each layer in said series of overlapping layers has a first side and a second side and wherein said series of overlapping layers has a folded serpentine shape such that said first side of one layer abuts said first side of an adjacent layer.

4. The snap-action valve assembly of claim 3, wherein said series of overlapping layers at each of said first and second coiled ends includes two layers on each side of said centerline plane.

5. The snap-action valve assembly of claim 3, wherein said series of overlapping layers at each of said first and second coiled ends includes two layers on one side of said centerline plane and one layer on an opposite side of said centerline plane.

6. The snap-action valve assembly of claim 3, wherein said series of overlapping layers at each of said first and second coiled ends includes four layers on one side of said centerline plane and one layer on an opposite side of said centerline plane.

7. The snap-action valve assembly of claim 3, wherein said longitudinal segment of said mass damper extends linearly along a centerline axis that is positioned in said centerline plane and wherein said series of overlapping layers at each of said first and second coiled ends are folded from an end segment that extends linearly along said centerline axis.

8. The snap-action valve assembly of claim 3, wherein said longitudinal segment of said mass damper extends linearly along a centerline axis that is positioned in said centerline plane and wherein said series of overlapping layers at each of said first and second coiled ends are folded from an end segment that extends linearly along an end segment axis that is arranged at an oblique angle relative to said centerline axis.

9. The snap-action valve assembly of claim 2, wherein each layer in said series of overlapping layers has a first side and a second side and wherein said series of overlapping layers has a spiral shape such that said first side of one layer abuts said second side of an adjacent layer.

10. The snap-action valve assembly of claim 9, wherein said longitudinal segment of said mass damper extends linearly along a centerline axis that is positioned in said centerline plane and wherein said series of overlapping layers at each of said first and second coiled ends spiral around said centerline axis.

11. The snap-action valve assembly of claim 2, wherein each of said first and second coiled ends has a center of gravity that is located in said centerline plane of said mass damper.

12. The snap-action valve assembly of claim 2, wherein each of said first and second coiled ends has a center of gravity that is spaced from said centerline plane of said mass damper in an inward direction that extends perpendicularly from said centerline plane towards said conduit.

13. The snap-action valve assembly of claim 2, wherein each of said first and second coiled ends has a center of gravity that is spaced from said centerline plane of said mass damper in an outward direction that extends perpendicularly from said centerline plane away from said conduit.

14. The snap-action valve assembly of claim 2, wherein said longitudinal segment of said mass damper extends linearly along a centerline axis that is positioned in said centerline plane and wherein each of said first and second coiled ends has a center of gravity that is positioned along said centerline axis.

15. The snap-action valve assembly of claim 2, wherein said longitudinal segment of said mass damper extends linearly along a centerline axis that is positioned in said centerline plane and wherein each of said first and second coiled ends has a center of gravity that is spaced from along said centerline axis by an off-set distance.

16. A snap-action valve assembly for an exhaust system, comprising:
    a conduit defining an exhaust passageway therein;
    a valve flap disposed within said exhaust passageway for controlling exhaust flow through said exhaust passageway;
    a shaft supporting said valve flap in said exhaust passageway for rotation about a pivot axis;
    a mass damper external to said conduit that is rotatably coupled to said shaft such that said mass damper rotates with said shaft, said mass damper including a longitudinal segment coupled to said shaft that extends between first and second coiled ends;
    said first and second coiled ends including a series of overlapping layers, each layer in said series of overlapping layers having a first side and a second side; and said series of overlapping layers at each of said first and second coiled ends having a spiral shape where said first side of one layer abuts said second side of an adjacent layer.

17. The snap-action valve assembly of claim 16, wherein said longitudinal segment of said mass damper extends in a centerline plane that is transverse to said pivot axis and wherein said series of overlapping layers at each of said first and second coiled ends spiral around a central axis that runs parallel to and is spaced from said centerline plane.

18. The snap-action valve assembly of claim 16, wherein said longitudinal segment of said mass damper extends linearly along a centerline axis and wherein said series of overlapping layers at each of said first and second coiled ends spiral around said centerline axis.

19. The snap-action valve assembly of claim 16, wherein said longitudinal segment of said mass damper extends in a centerline plane that is transverse to said pivot axis and wherein each of said first and second coiled ends includes oppositely wound coil structures that are positioned on opposing sides of said centerline plane.

20. A snap-action valve assembly for an exhaust system, comprising:
    a conduit defining an exhaust passageway therein;
    a valve flap disposed within said exhaust passageway for controlling exhaust flow through said exhaust passageway;
    a shaft extending through said conduit and supporting said valve flap in said exhaust passageway for rotation about a pivot axis, said shaft extending between a first end and a second end;
    a biasing member external to said conduit and connected to said second end of said shaft that biases said valve flap towards said closed position;
    a mass damper external to said conduit that is rotatably coupled to said first end of said shaft such that said mass damper rotates with said shaft, said mass damper including a longitudinal segment coupled to said shaft that extends linearly between first and second coiled ends;
    said longitudinal segment including an inboard side that faces said conduit and an outboard side that faces away from said conduit; and
    said first and second coiled ends including a series of layers, at least one layer in said series of layers overlapping at least a portion of said inboard side of said longitudinal segment at said first and second coiled ends, and at least one layer in said series of layers overlapping at least a portion of said outboard side of said longitudinal segment at said first and second coiled ends.

* * * * *